(12) United States Patent
Lucey et al.

(10) Patent No.: US 9,351,569 B1
(45) Date of Patent: May 31, 2016

(54) PARTS SUPPLY DRAWER SYSTEM FOR ROBOT ASSISTED MANUFACTURING

(71) Applicant: Automated Cells and Equipment, Inc., Painted Post, NY (US)

(72) Inventors: Michael Lucey, Corning, NY (US); James Morris, Pine Valley, NY (US)

(73) Assignee: Automated Cells and Equipment, Inc., Painted Post, NY (US)

( * ) Notice: Subject to any disclaimer, the term of this patent is extended or adjusted under 35 U.S.C. 154(b) by 150 days.

(21) Appl. No.: 14/150,189

(22) Filed: Jan. 8, 2014

Related U.S. Application Data

(60) Provisional application No. 61/763,034, filed on Feb. 11, 2013.

(51) Int. Cl.
| | | |
|---|---|---|
| *B65G 1/00* | (2006.01) | |
| *B65G 65/00* | (2006.01) | |
| *A47B 88/04* | (2006.01) | |
| *B65G 1/04* | (2006.01) | |

(52) U.S. Cl.
CPC .............. *A47B 88/04* (2013.01); *B65G 1/0435* (2013.01)

(58) Field of Classification Search
CPC .................................................... B65G 1/0435
USPC ........................................................ 414/280
See application file for complete search history.

(56) References Cited

U.S. PATENT DOCUMENTS

| | | | | | |
|---|---|---|---|---|---|
| 2,954,882 | A | * | 10/1960 | Dailey | ................... B30B 15/028 100/196 |
| 4,203,696 | A | * | 5/1980 | Lindberg | ................ B65G 65/00 414/277 |
| 4,362,454 | A | * | 12/1982 | Kripzak | .................... B23Q 7/10 414/267 |
| 4,541,762 | A | * | 9/1985 | Tischler | .................... B23Q 7/04 414/416.07 |
| 4,547,066 | A | * | 10/1985 | Murai | ..................... G03B 27/04 355/100 |

(Continued)

OTHER PUBLICATIONS

Yaskawa-Motoman Robotics; Solutions in Motion; Feb. 2011; PDF document from web site: www.motoman.com/.

*Primary Examiner* — Daniel J Troy
*Assistant Examiner* — Kimberley S Wright
(74) *Attorney, Agent, or Firm* — Randall L. Reed; Miller Mayer LLP

(57) ABSTRACT

An apparatus for storing and presenting parts to a robot for automated tending of various manufacturing processes. The method and apparatus allow for an operator, human or other tending robot, to open and place parts into a series of vertically stacked drawers within an enclosure. On the opposing side of the enclosure is the production side where a robot opens an individual drawer and while the drawer is open, successively picks out parts for use in the manufacturing processes as it is programmed to do. The part may or may not be placed back into the drawer based on the part manufacturing process. The robot then closes the drawer and successively cycles through the drawers, opening them on the production side and once the parts have been processed, closing them. The operator then successively opens each drawer, removes any processed parts, if placed back into the drawer as dictated by the part manufacturing process, refills the drawer with new parts and then closes it.

16 Claims, 22 Drawing Sheets

(56) References Cited

U.S. PATENT DOCUMENTS

| | | | |
|---|---|---|---|
| 4,619,575 A * | 10/1986 | Summa | B65G 1/0435 294/118 |
| 4,678,390 A * | 7/1987 | Bonneton | B65G 1/1375 294/4 |
| 4,750,633 A * | 6/1988 | Schafer | B65G 1/0435 206/599 |
| 4,756,657 A * | 7/1988 | Kinney | B65G 1/0435 414/280 |
| 4,789,295 A * | 12/1988 | Boucher, Jr. | B66C 1/24 294/2 |
| 4,808,057 A * | 2/1989 | Chiappe | B65G 47/514 198/347.3 |
| 4,979,464 A * | 12/1990 | Kunze-Concewitz | H01L 21/67769 118/719 |
| 5,085,553 A * | 2/1992 | Bouwens | H05K 13/0061 414/331.1 |
| 5,187,423 A * | 2/1993 | Marton | B60K 1/04 104/34 |
| 5,427,490 A * | 6/1995 | Tokiwa | B65G 1/0442 414/280 |
| 5,451,132 A * | 9/1995 | Tokiwa | B23Q 7/001 414/416.05 |
| 5,833,076 A | 11/1998 | Harres et al. | |
| 5,857,830 A | 1/1999 | Harres et al. | |
| 5,947,468 A | 9/1999 | McKee et al. | |
| 5,993,132 A | 11/1999 | Harres et al. | |
| 6,026,967 A | 2/2000 | Isaacs et al. | |
| 6,059,509 A | 5/2000 | Ostwald | |
| 6,071,060 A | 6/2000 | Campbell et al. | |
| 6,082,797 A * | 7/2000 | Antonette | B25J 9/104 294/103.1 |
| 6,135,697 A | 10/2000 | Isaacs et al. | |
| 6,234,550 B1 * | 5/2001 | Stoltenhoff | B65G 1/0435 294/119.1 |
| 6,360,792 B1 | 3/2002 | Ganz et al. | |
| 6,390,756 B1 | 5/2002 | Isaacs et al. | |
| 6,416,270 B1 * | 7/2002 | Steury | G07F 11/16 414/268 |
| 6,445,976 B1 * | 9/2002 | Ostro | B65D 19/38 700/226 |
| 6,505,900 B2 * | 1/2003 | Frederick | A47B 67/04 108/137 |
| 6,524,052 B1 | 2/2003 | Yamauchi et al. | |
| 6,637,473 B2 | 10/2003 | Ganz et al. | |
| 6,652,724 B2 | 11/2003 | Michael et al. | |
| 6,932,895 B2 | 8/2005 | Anderson et al. | |
| 6,985,616 B2 | 1/2006 | Ganz et al. | |
| 7,352,889 B2 | 4/2008 | Ganz et al. | |
| 7,635,246 B2 | 12/2009 | Neeper et al. | |
| 7,648,321 B2 | 1/2010 | Neeper et al. | |
| 7,918,641 B2 | 4/2011 | Sugiyama et al. | |
| 8,047,756 B2 * | 11/2011 | Tuffs | B60L 15/38 198/463.3 |
| 8,083,994 B2 | 12/2011 | Neeper et al. | |
| 8,252,232 B2 | 8/2012 | Neeper et al. | |
| 8,365,639 B2 | 2/2013 | Sutton | |
| 8,465,243 B2 * | 6/2013 | Van Ooyen | B65G 1/04 414/281 |
| 8,468,243 B2 * | 6/2013 | Ogawa | G06F 17/30315 709/201 |
| 8,998,554 B2 * | 4/2015 | Toebes | B65G 1/04 414/273 |
| 2006/0032747 A1 | 2/2006 | Anderson et al. | |
| 2008/0118336 A1 * | 5/2008 | McIlvaine | B65G 1/026 414/280 |
| 2010/0031685 A1 | 2/2010 | Zumstein et al. | |
| 2011/0074458 A1 | 3/2011 | Di Stefano et al. | |
| 2012/0163945 A1 | 6/2012 | Neeper et al. | |
| 2012/0186192 A1 * | 7/2012 | Toebes | B65G 1/04 53/235 |
| 2015/0203294 A1 * | 7/2015 | Yamada | B65G 1/0407 294/81.6 |
| 2015/0203295 A1 * | 7/2015 | Nakamura | B66F 9/07 414/274 |
| 2015/0210472 A1 * | 7/2015 | Nakamura | B65G 1/0407 414/661 |
| 2015/0239665 A1 * | 8/2015 | Toebes | B65G 1/04 414/808 |

* cited by examiner

PARTS SUPPLY DRAWER SYSTEM FOR ROBOT ASSISTED MANUFACTURING

CROSS-REFERENCE TO RELATED APPLICATIONS

This application claims the benefit of priority under 35 U.S.C. §119 of U.S. Provisional Application Ser. No. 61/763,034 filed on Feb. 11, 2013 the content of which is relied upon and incorporated herein by reference in its entirety.

TECHNICAL FIELD

The disclosure relates generally to a system and apparatus for facilitating an automated manufacturing process, more particularly it relates to a system and apparatus for providing a steady and uninterrupted stream of prepositioned articles in a manufacture process for robot pickup.

BACKGROUND

Human operators have been tending, loading and unloading manufacturing machines for many years. While human operators allow for flexibility in the manufacturing process, they also introduce errors due to the repetitive nature of automated mass assembly lines, they add to cost, and require frequent downtime. Modern day manufacturing practices dictate continual process improvement including: increased part quality, increased throughput, increased reliability, decreased part cost, reduced scrap, and continuous operation sometimes 24/7. One method for meeting these goals is the use robotics. Industrial robots are good at repetitive motions and are very good at material handling such as pick and place applications. Robots minimize the variables an operator introduces when handling parts such as, improper part placement into the manufacturing machine, dropped or damaged parts or even the inconsistency in loading or unloading a waiting manufacturing machine in a timely manner. Many times the use of robotics enables a human operator to control operation of multiple manufacturing machines as opposed to being tied to tending just one machine.

One critical aspect for the successful implementation of robotic manufacturing and material handling applications is that parts must be presented to the manufacturing robot in a consistent, reliable and repeatable method. The second aspect is that the human operator understands supports and is able to provide a continuous uninterrupted supply of parts to the manufacturing robot during the production process. Accordingly, there is a need in the industry for a method and apparatus for providing an intuitive consistent parts supply for robot assisted manufacturing.

SUMMARY

Accordingly a system is provided for minimizing man power requirements by automating the material handling process of parts suitable for robot pickup in a robotic manufacturing system. Minimization of the amount of time it takes to load and unload a parts supply machine or a plurality of machines is accomplished by automating parts handling as a subset of the manufacturing process. Parts are provided in a consisted repeatable and pre-designated position suitable for robot pick up for inclusion of the part in the robot assisted manufacturing process. The system uses multiple bi-directional drawers accessible by a human operator or attending parts supply robot on a supply side of the drawer system and accessible by a manufacturing production robot with on the production side of the drawer system. Securing and positioning mechanisms are provided for precise positioning of each bi-directional drawer when it is in an open position on the production side, at a closed center position and in an open position on the supply side of the drawer system. The system includes an apparatus and method for repeatable precise positioning of parts in each drawer for the pre-programmed manufacturing robot to further facilitate the function of the system. The system has modularity for quick installation and setup to thereby allow for easy integration into a new or existing manufacturing process.

In accordance a preferred embodiment of the present invention, the part supply drawer enclosure includes: a top, sides, multiple vertically stacked bi-directional drawers, drawer position sensing switches and drawer locking pins and stops secured to the enclosure side panels for interface with the drawer geared handle levers.

In a preferred embodiment, each drawer further includes: a drip pan located inside the drawer secured with part fixing locators, bi-directional telescoping drawer slides and dual handles attached to geared lever arms providing concurrent handle motion during drawer locking and unlocking.

In a preferred embodiment, the part supply drawer enclosure top further includes an available work surface suitable for additional part manufacturing processes, securing points for mounting of the robot controller and securing points to attach a protective barrier.

In accordance with the preferred embodiment of the present invention, a method for quick installation and commissioning of the part supply drawer system for robot assisted manufacturing includes: a common framework for mounting the said part supply drawer enclosure and the robot. The frame work further includes: integral fork truck pockets for lifting and positioning of the system in its entirety, a cable passageway and cover channel for securing and protecting robot cables routed from the robot controller mounted on top of the part supply drawer enclosure to the robot. In an alternative preferred embodiment the parts supply draw system can be configured as a stand-alone system that works with a robot without a common framework connecting them.

In accordance with the preferred embodiment of the present invention, robot tooling includes a singular or plural combination of part gripping methods and components and such as: a frame to hold gripping components with securing points to robot arm and a hook shaped apparatus at the opposing end that provides an interface to the part supply drawer handle. The hook apparatus further provides a method for lifting the drawer handles as well as a method for positively placing the handle back down in its locked position.

The invention provides a parts supply drawer apparatus for a robot assisted manufacturing system that includes: a) a drawer enclosure; b) with one or more drawers in the drawer enclosure, the drawer being movable from an open production position to a closed position to an open operation position, whereby access to the drawer is available at the production position and the operation position; c) locking mechanisms for detachably locking the drawer in the closed position, the production position and the operation position; d) the drawer has a positioning apparatus to precisely place the drawer at the production position in a repeatable precise and predetermined position; and e) a removable positioning matrix in the drawer to thereby precisely position within the drawer a plurality of work pieces placed in the matrix for extraction from the at least one drawer by a robot during a manufacturing process.

In a further aspect of the invention the locking mechanism includes a production lever and an operation lever, wherein the production lever and the operation lever each have first ends that are geared together and pivotally mounted at their first ends at the center of a first end of the drawer and wherein the production lever projects to a production side of the drawer and terminates in a second end and the operation lever projects to an operation side of the drawer and terminates in a second end and when either the second end of the production lever or the second end of the operation lever are moved both levers move in unison to unlock the drawer for movement among the open production position, the closed position and the operation position.

In another aspect of the invention of the parts supply drawer apparatus the production lever and the operation lever each have a notch adjacent to the second end of each lever such that when the drawer is in the locked closed position the notch of the production lever is positioned on a locking knob attached to the drawer enclosure on the production side and the notch of the operation lever is positioned on a locking knob attached to the drawer enclosure on the operation side and movement of either the second end of the production lever or the second end of the operation side lever lifts both levers off of the locking knobs to unlock the drawer for movement.

In yet another aspect of the invention when the drawer is locked at the production position the notch of the operation lever rests on the locking knob on the production side of the drawer enclosure and when the drawer is locked at the operation position the notch of the production lever rests on the locking knob on the operation side of the drawer enclosure.

In a further aspect of the invention the parts supply drawer apparatus includes a mirror image production lever and a mirror image operation lever on an a second end opposite the first end of the drawer that function in the same fashion as the production lever and the operation lever and a production handle connects the second end of the production lever to a second end of the mirror image production lever and an operation handle connects the second end of the operation lever to a second end of the mirror image operation lever, and when either the production handle or the operation handle are moved the levers move in unison to unlock or lock the drawer.

In another aspect of the invention the parts supply drawer apparatus includes a first flange adjacent the production side of the drawer so that when the drawer is moved to the operation position the first flange engages a stopping pin on the drawer enclosure adjacent the operation side which stops and positions the drawer in a predetermined position at the operation position and a second flange adjacent the operation side of the drawer so that when the drawer is moved to the production position the second flange engages a stopping pin on the drawer enclosure adjacent the production side of the drawer enclosure which stops and positions the drawer in a predetermined position at the production position.

In a further aspect of the invention the first ends of the production lever and the operation lever are geared together by interleaved toothed gears to allow for both levers move up and down together in unison, whereby when one of the levers moves in a clockwise direction the other lever moves in a counterclockwise direction.

In yet another aspect of the invention sensors are positioned on the drawer enclosure and on the drawer to allow a computer aided production system to determine the position of the drawer at the production position, the closed position and the operation position. Also a robot controller is included for monitoring drawer position with the sensors thus controlling the operation of a manufacturing robot accessing the drawer during a manufacturing process. In one variation of the invention the robot or computer control system to determine drawer position uses a sensor positioning system with reflectors attached to drawer levers which interact with sensors or transceivers positioned on the interior super structure of the parts supply drawer system.

In yet another aspect of the invention the parts supply drawer apparatus includes a structure for supporting and positioning the drawer enclosure for use in a manufacturing operation the structure including a frame having a base configured to receive forks of forklift truck to engage structure for supporting and positioning the drawer enclosure to thereby facilitate movement of the parts supply drawer apparatus by a forklift. The structure can and also include a base on which to position a robot to access the drawer enclosure during a manufacturing process and the support structure can be configured in a T shape to minimize use of floor space and allow for operator access during a manufacturing process.

In yet a further aspect of the invention it includes robotic arm with a robot tool to engage a handle on the production end of the drawer. Additionally the robot tool can include a hook to engage the handle on the drawer to unlock it and move it between the closed position and the production position and grasping mechanism to grasp and pick up parts positioned in the drawer.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
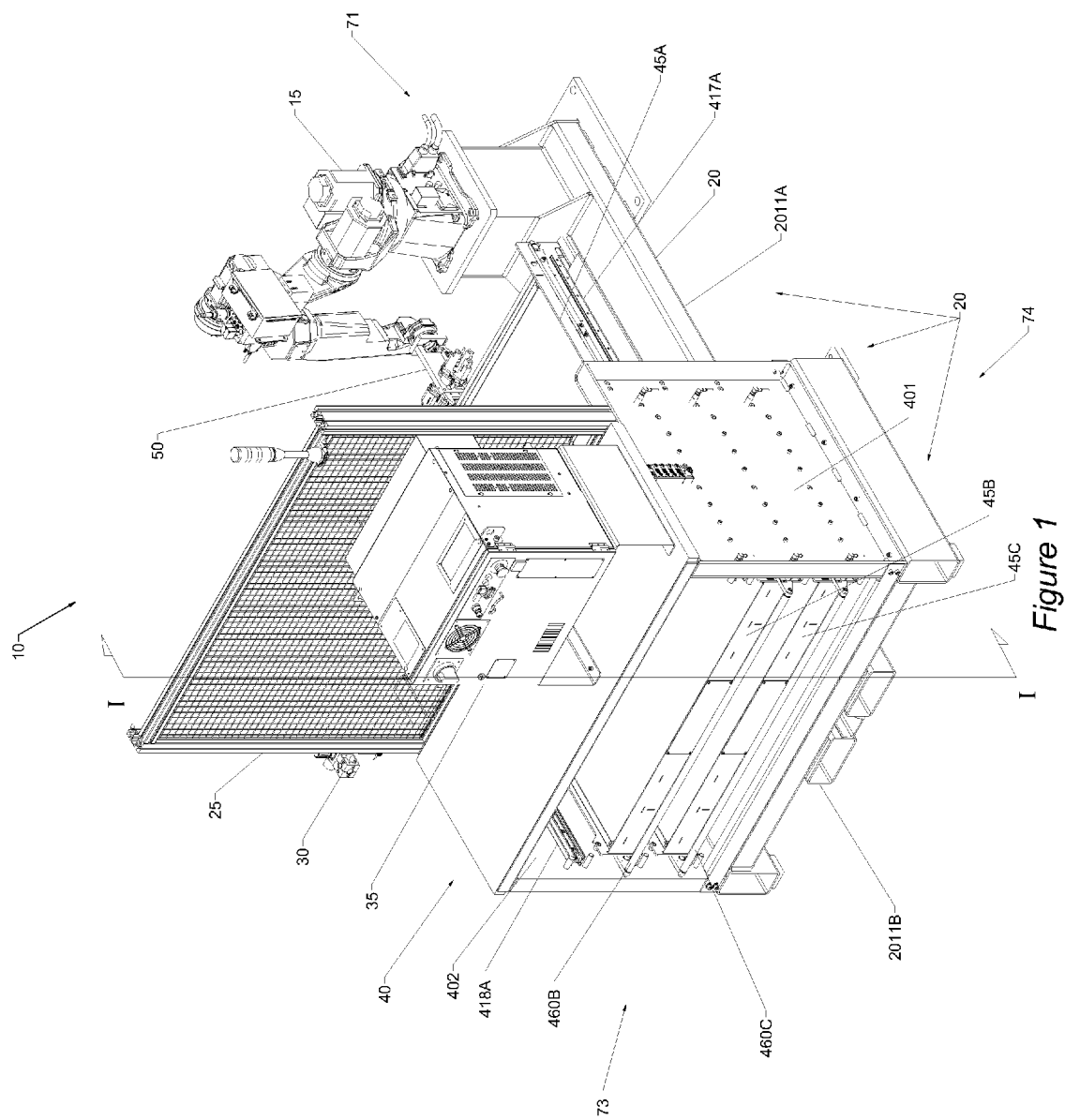
FIG. 1 is a perspective view from the operator supply side-sensor end of the part supply drawer system for robot assisted manufacturing.
Figure 2:
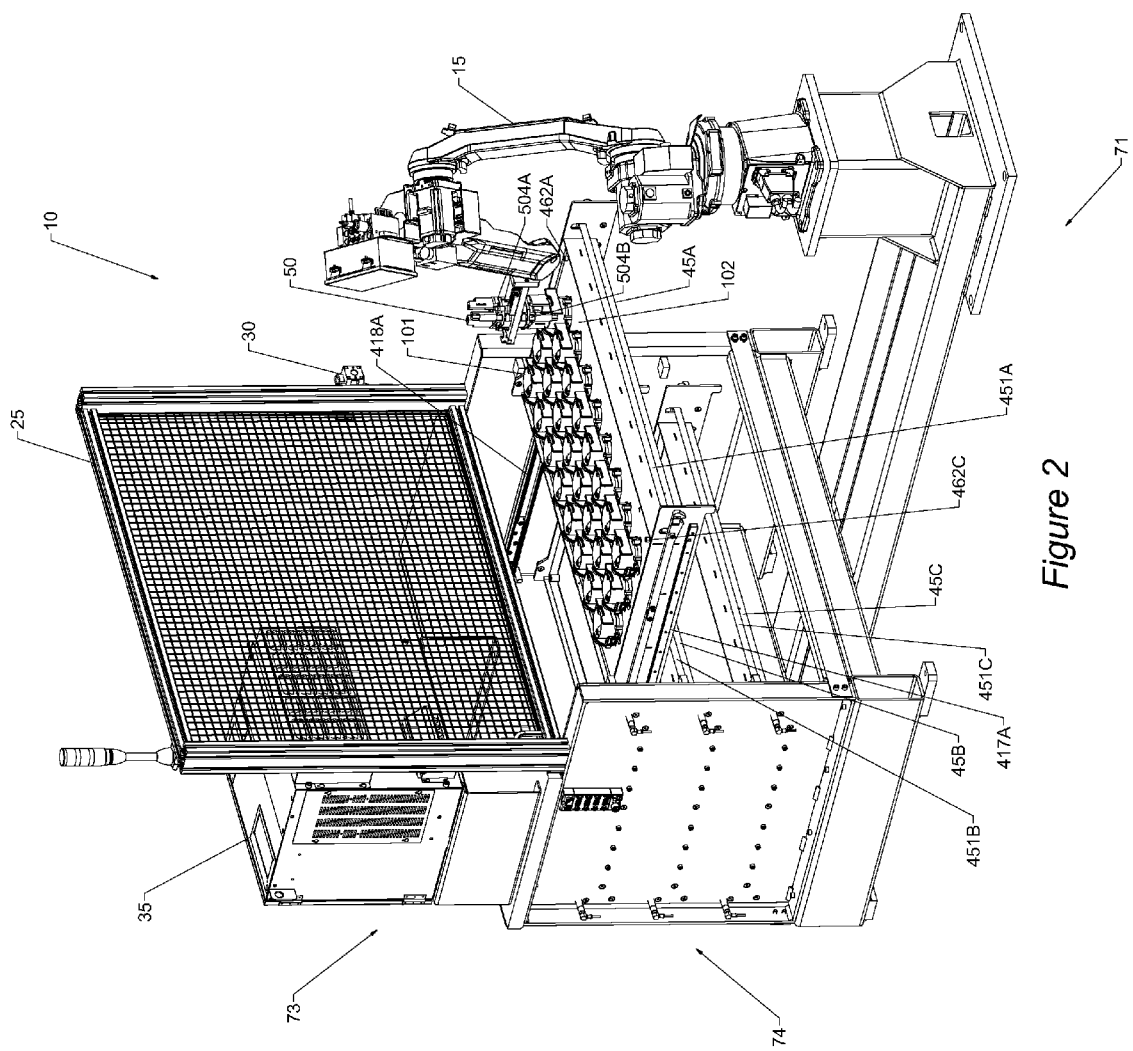
FIG. 2 is a perspective view from the production side-sensor end of the part supply drawer system for robot assisted manufacturing.

The present invention is directed toward an automated apparatus for storing and presenting parts to a robot for automated tending of various manufacturing processes.
Overview of the System and Apparatus:

As noted above the present system and apparatus provides a parts supply drawer system and assembly that is capable of providing a continuous supply of prepositioned parts used in a continuous operation robot manufacturing process. FIG. 1 is a perspective view of the assembly from the operator side 73 sensor end 74 of the parts supply manufacturing assembly 10 which basically consists of a robot 15 including a robot tool 50, a framework 20, a part supply drawer enclosure 40 including three vertically stacked drawers 45A, 45B and 45C, a robot controller 35, a robot pneumatic air supply unit 30 or some other power supply for mechanical motion and an enclosure panel 25. FIG. 2 provides a perspective view of parts supply manufacturing assembly 10 from production side 71 sensor end 74 with a plurality of parts 101 that are to be used in the manufacturing system positioned by part fixing apparatus 102 in a precise predetermined position in drawer 45A.

As will be discussed below in more detail drawers 45A, 45B and 45C are bidirectional opening to both operator side 73 and the production side 71. When opened to the operator side parts 101 can be positioned by a human operator or tending robot, both of which are not shown, in each drawer for use in the manufacturing process. In a preferred embodiment they are positioned by parts supply part fixing apparatus or matrix 102. Once the parts are positioned in the drawers the drawer is moved to the closed and locked position. In a preferred embodiment production robot 15 then using robot tool 50 located at the end of robot arm 17 unlocks the drawer pulls it open and can grasp each of the parts 101 with robot tool 50. During operation production robot 15 will cycle through each of drawer 45A, 45B and 45C and thus be provided with a continuous flow of parts 101 for a continuous manufacturing process by a human operator or tending robot positioned, not shown, on the operator side refilling the drawers as they are emptied by production robot 15. Controller 35 a computer is programmed to control operation of production robot 15.

Operation of Parts Supply Drawer Assembly:

FIGS. 3A, 3B, 3C, 3D and 3E are a cross-sectional side view of parts supply drawer enclosure 40 along plane I-I of FIG. 1 on the non-sensor end 75 with non-sensor end frame panel 402 removed to reveal for description the function of some of the interior structure of the parts supply drawer enclosure 40, and drawers 45A, 45B and 45C.

Figure 3A:
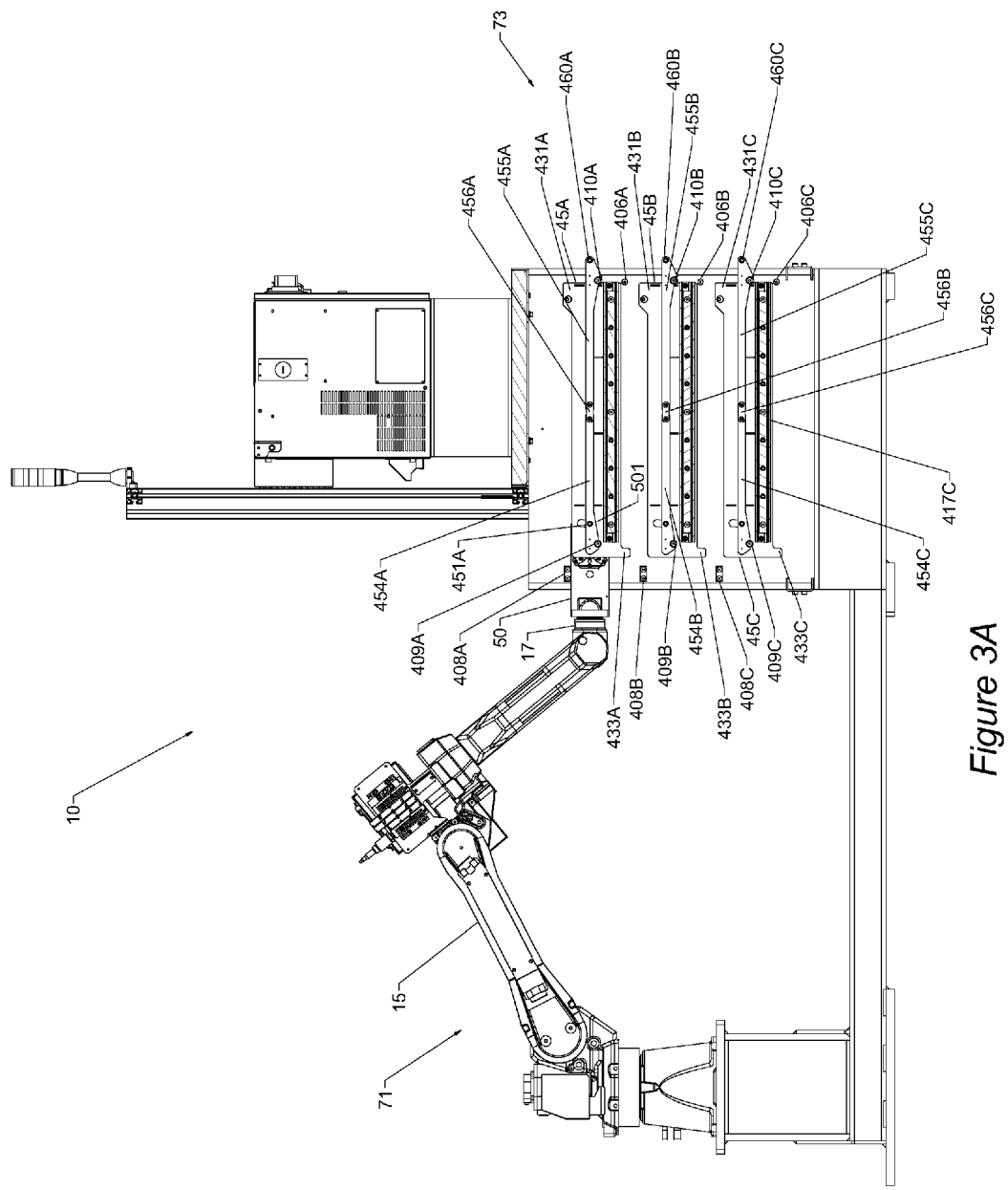
FIG. 3A is a side view of the part supply drawer system (along plane I-I of FIG. 1 with drawer enclosure side panel removed for description purposes) illustrating the a drawer while the drawer is in fully locked position prior to unlocking and opening a drawer to begin the production process.

Referring to FIG. 3A, drawer assembly 45A includes production side geared lever 454A and operator side geared lever 455A which meet at retaining strap 456A where they are geared for simultaneous up and down movement. The gearing process will be discussed in detail below. As depicted in FIG. 3A operator side geared lever 455A at its outer end rests on operator side drawer lock pin 410A and production side geared lever 454A rests at its outer end on production side locking pin 409A. The tip of the end of production side handle 451A can be seen on production side geared lever 454A (FIG. 2 provides a full view of production handle 451A). The tip of the end of operator side handle 460A can be seen attached to the end of operator geared lever 455A (FIG. 1 provides a view of operator handles 460B of drawer 45B and handle 460C of the drawer 45C). Drawer assembly 45A also has production side stop flange 431A and operator side stop flange 433A. Additionally production side drawer full extension stop pin 408A is visible as well as operator side drawer full extension stop pin 406A is visible. Stop pins 408A and 406A as well as locking pins 410A and 409A are not attached to drawer assembly 45A but in the embodiment depicted are attached to end frame panel 402 (see FIG. 2) which as noted has been removed in FIGS. 3A to 3E for purposes on description.

Likewise drawer assembly 45B and 45C have all of the same features as drawer assembly 45A with the change in nomenclature from "A" to "B" and "C" at the end of each number. For example drawer assembly 45B works with full extension stop pin 408B and 406B as well as locking pins 410B and 409B. Drawer assembly 45C works with full extension stop pin 408C and 406C as well as locking pins 410C and 409C.

Figure 3B:
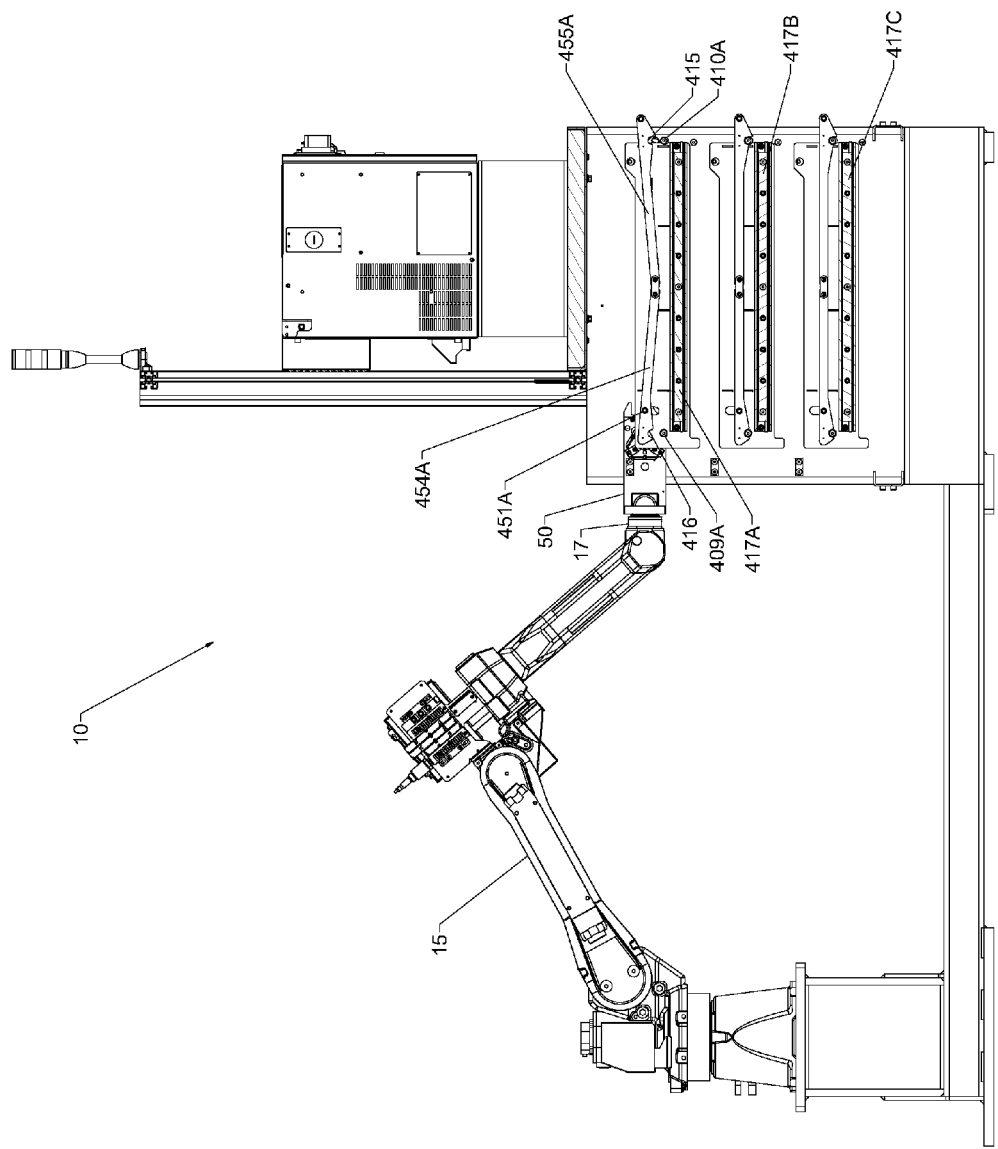
FIG. 3B is a side view of the part supply drawer system (along plane I-I of FIG. 1 with drawer enclosure side plane removed for descriptive purposes) illustrating the drawer after its has been moved to the unlocked position on the production side prior to pulling out the drawer to its full open position.

The drawer assembly functions as follows: robot 15 with robot tool 50 operatively attached to robot arm 17 grasps production side handle 451A as depicted in FIG. 3B. Referring to FIG. 3B robot 15 then lifts up handle 451A lifting production side lever 454A off of a locking pin 409A. Simultaneously through gearing connecting production side lever 454A to operator side lever 455A moves up simultaneously and is lifted off of operator side locking pin 410A. Operator side locking notch 415 on lever 455A and production side locking notch 416 on lever 454A can be seen in FIG. 4B. When drawer 45A is in the locked closed position of FIG. 3A notch 415 rests on locking pin 410A and notch 416 rests on locking pin 409A.

Figure 3C:
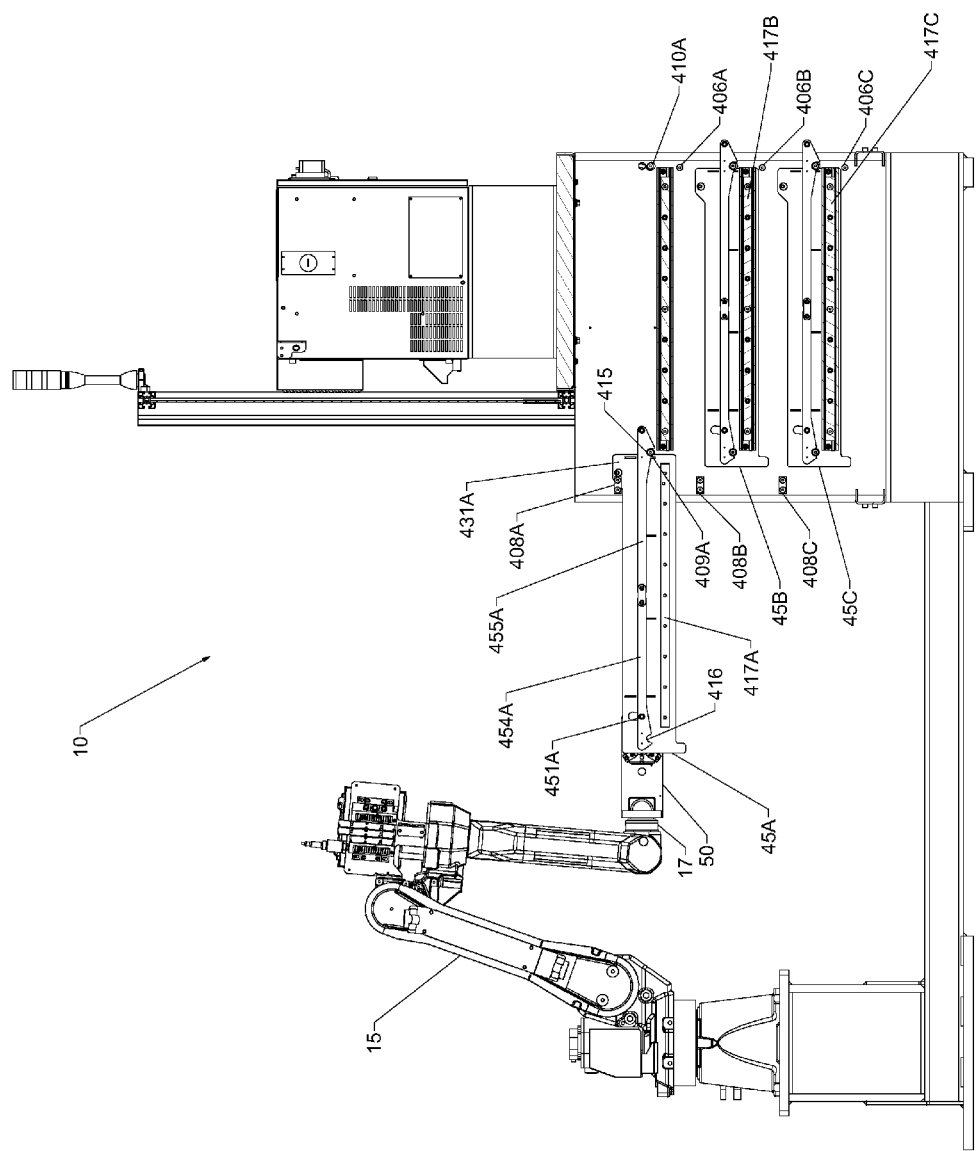
FIG. 3C is a side view of the part supply drawer system (along plane I-I of FIG. 1 with drawer enclosure side plane removed for descriptive purposes) illustrating a drawer after it has been pulled to the full open and locked position on the production side of the part supply drawer enclosure.

Referring to FIG. 3C robot arm 17 then pulls drawer assembly 45A out to its full extent which is the point at which production side stop flange 431A makes contact with production side drawer full extension stop pin 408A. Drawer 45A slides out on bi-directional telescoping drawer slide 417A and bi-directional telescoping drawer slide 418A on the opposite end of drawer 45A can be seen in FIGS. 1 and 2. Drawers 45B and 45C likewise have bi-directional drawer sides on either end form movement of them among the production, closed or operation positions. Referring back to FIG. 3C, robot arm 17 then lowers handle 451A so that both production side lever 454A and operator side lever 455A simultaneously swings back down until operator side lever 455A makes contact with production side locking pin 409A at when notch 415 of lever 455A rests on locking pin 409A to thereby lock drawer assembly 45A in the production position. Robot 15 can then start picking up the parts placed in drawer assembly 45A, using them in the production process as depicted in FIG. 2. Once robot 15 has removed all the parts from the drawer to be used in the manufacturing process it closes the drawer moving it back to the closed position as depicted in FIG. 3A. Robot arm 15 then moves to drawer assembly 45B, opens it in the same fashion as described as drawer 45A, locks it in position and then removes the parts placed in the drawer for the production process, it then closes drawer assembly and proceeds to drawer assembly 45C and repeats the same process.

Figure 3D:
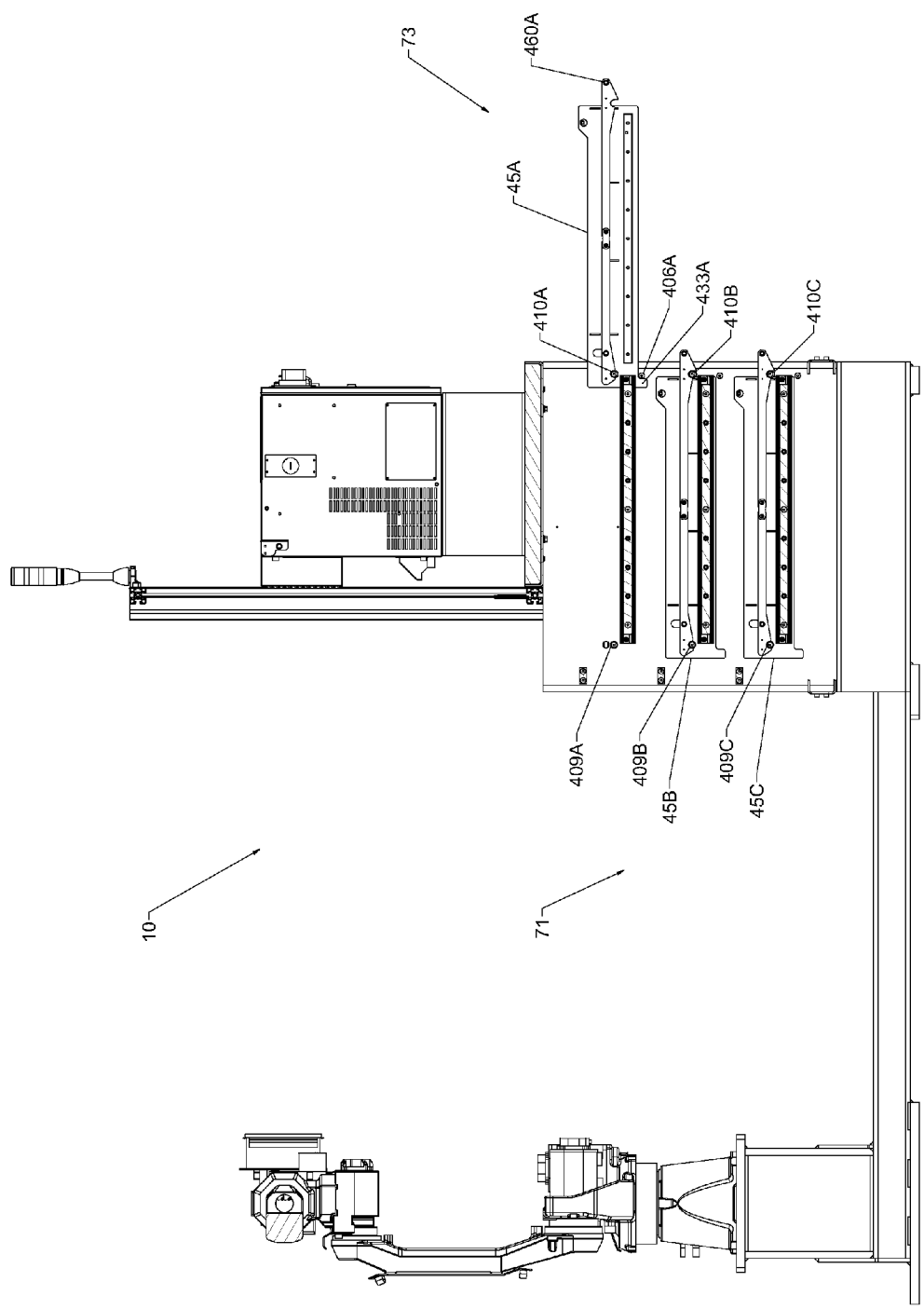
FIG. 3D is a side view of the part supply drawer system (along plane I-I of FIG. 1 with drawer enclosure side plane removed for descriptive purposes) illustrating the full open and locked drawer position on the operator side of the part supply drawer enclosure.
Figure 3E:
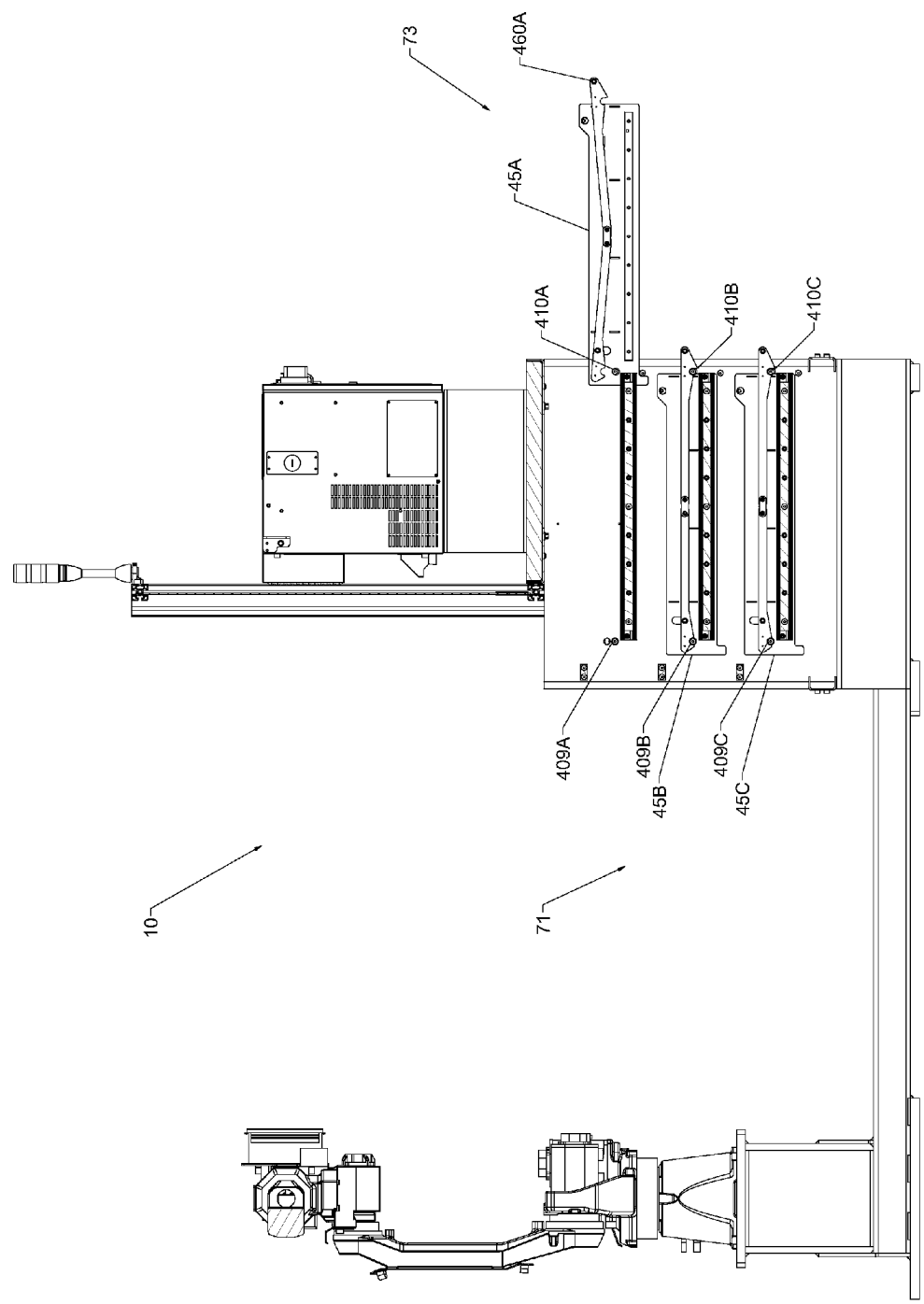
FIG. 3E is a side view of the part supply drawer system (along plane I-I of FIG. 1 with drawer enclosure side plane removed for descriptive purposes) illustrating the full open unlocked position of a drawer on the operator side of the part supply drawer enclosure.

While robot 15 is cycling through drawer assemblies 45A, 45B and 45C as described above either a tender robot or a human operator on the opposite side, not shown, would refill each drawer assembly that have been emptied by robot 15. They would do so by lifting operator side handle 460A and move the drawer to the open locked operator position as depicted in FIG. 3D. Then the tender robot or the attending human operator would refill the drawer with parts to be used in the manufacturing process, lift up handle 460A as depicted in FIG. 3E and then close the drawer returning it to the closed center locked position of FIG. 3A. The tender robot or human would cycle through each drawer as it is emptied by the production side robot to thus assure a continuous manufacturing process by supplying a continuous stream of parts in a predefined position in each drawer. The parts supply drawer systems can also be used in a product finishing system wherein robot 15 picks out parts or work pieces 101 (see FIG. 2) from the draw performs a finishing or fabrication step on a work piece 101 or passes it on to another machine to perform the finishing step and then repositions the work piece in the drawer. Once the robot has completed the finishing step on each part and returned it to the drawer and closed it, the operator opens the drawer of worked on parts and moves them to the next stage of the production process.

Drawer Assembly

Figure 4A:
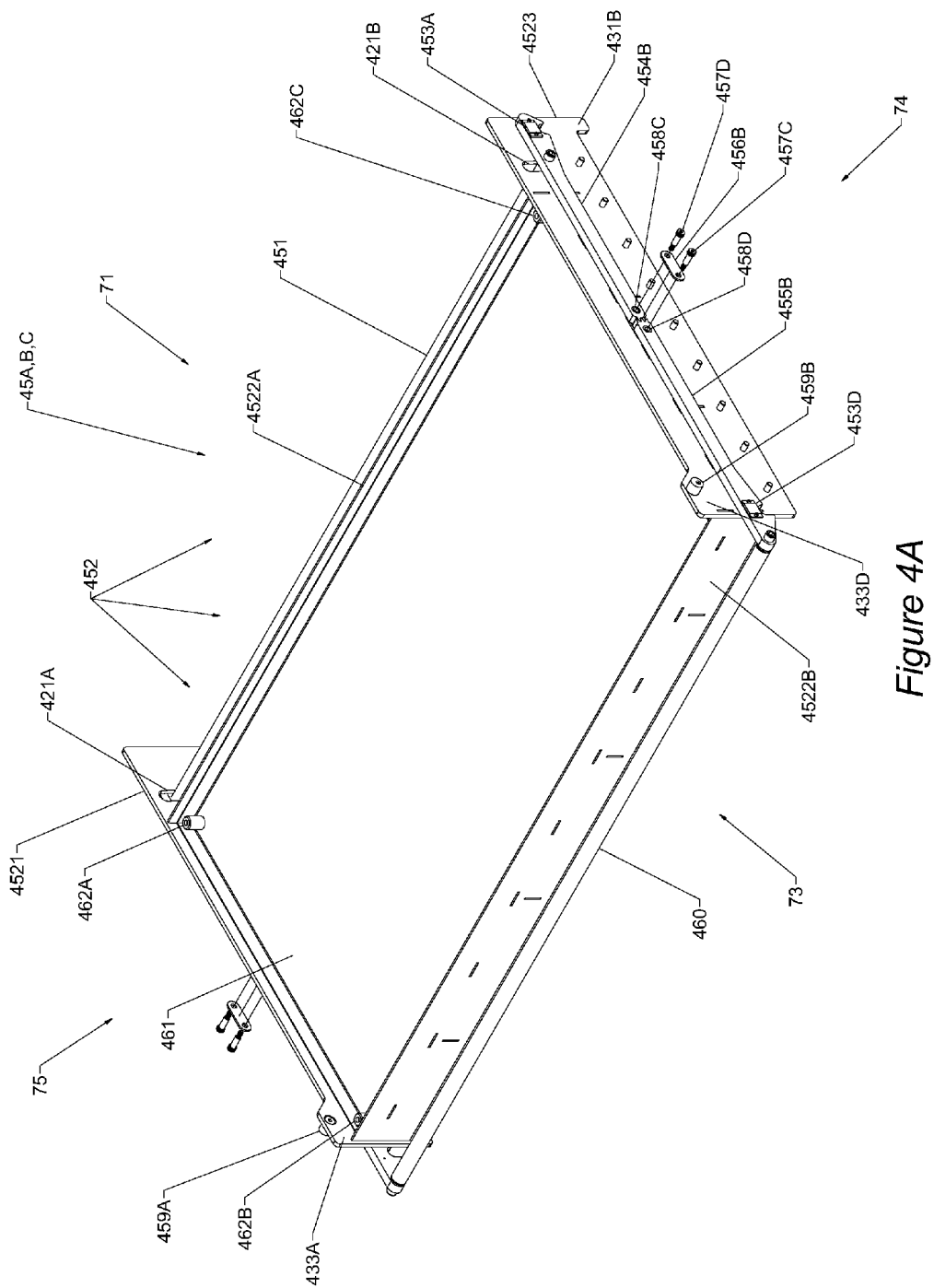
FIG. 4A is a perspective view of the position sensor end of a single drawer assembly illustrating the drawer handles, geared levers, lever pivots, position sensing, drip pan and part fixing locators for the part supply drawer enclosure with retaining strap and pivot bolts in an exploded view.

FIG. 4A is a perspective view of drawer assembly 45 from the operator side 73-sensor end 74. Drawer assembly 45 is representative of drawer assemblies 45A, 45B and 45C. As can be seen in FIG. 4A drawer assembly 45 consists of drawer structure 452, which includes sensor end drawer plate 4523, non-sensor end drawer plate 4521, production side plate 4522A, operator side plate 4522B, drip tray 461 and part fixing locators 462A, 462B, 462C and 462D located in the drip tray. Additionally, drawer assembly 45 includes geared levers 454B and 455B, pivot bushings 458D and 458C, pivot bolts 457C and 457D, retaining strap 456B sensor reflectors 453A and 453D, eccentric operator side stop pins 459A and 459B, production side handle slots 421A and 421B, operator side handle 460 and production side handle 451. Operator side flanges 433A and 433D as well as production side flange 431B are visible. Eccentric stop pins 459A & B and handle slots 421A & B are designed to limit movement of the handles.

Figure 4B:
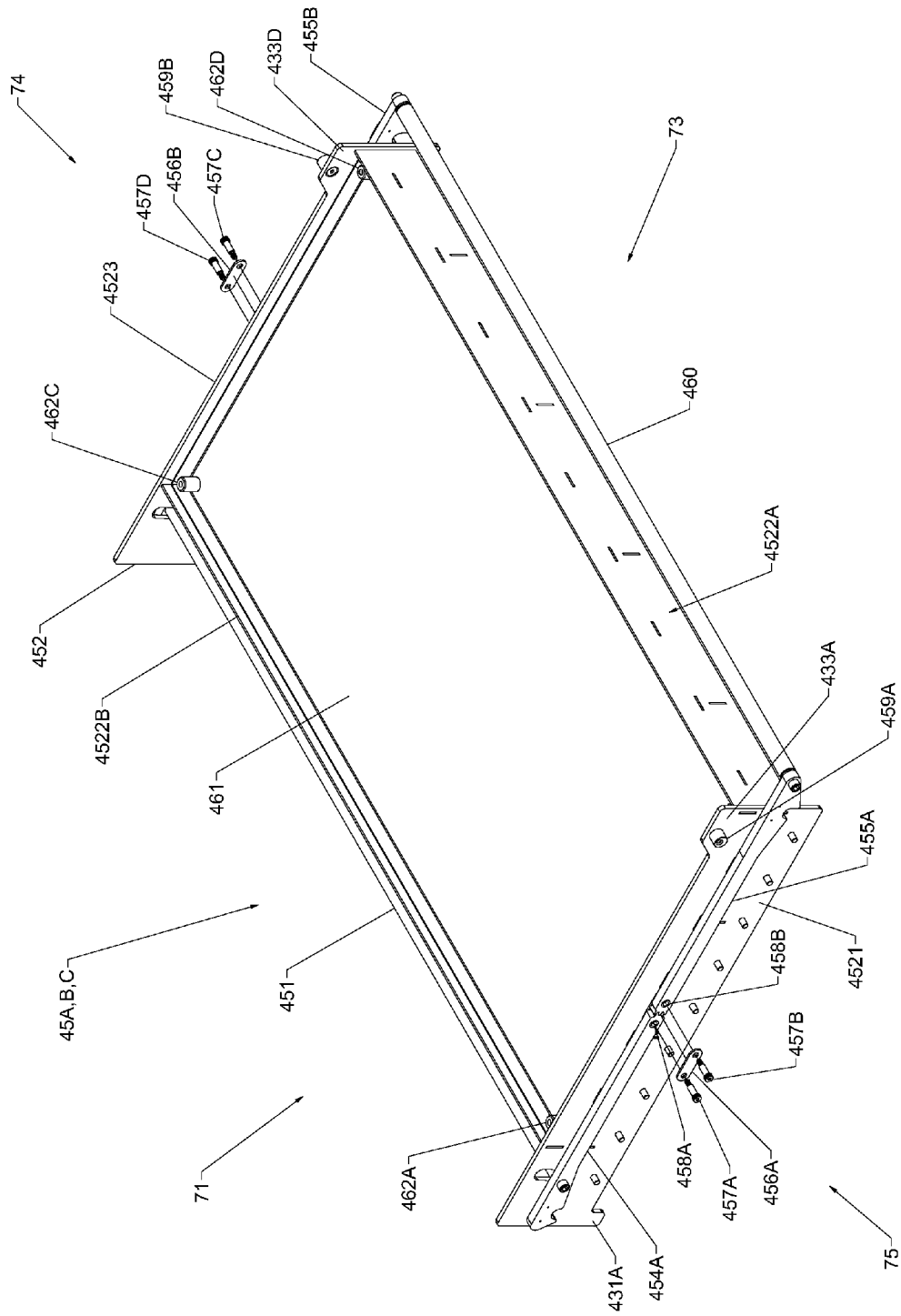
FIG. 4B is a perspective view of the opposing end from that of FIG. 4A of a single drawer assembly illustrating the drawer handles, geared levers, lever pivots, drip pan and part fixing locators for the part supply drawer enclosure with retaining strap and pivot bolts in an exploded view.

FIG. 4B is a perspective view of drawer assembly 45 from the operator side 73-non-sensor end 75. As can be seen in FIG. 4B drawer assembly 45 includes drawer structure 452, which as already noted above includes sensor end drawer plate 4523, non-sensor end drawer plate 4521, production side plate 4522A, operator side plate 4522B, drip tray 461 and part fixing locators 462A, 462B, 462C and 462D located in the drip tray. Additionally, from the perspective shown drawer assembly 45 includes a mirror image set of levers and related parts as that shown in FIG. 4A discussed in the previous paragraph above, namely geared levers 455A and 454A, pivot bushings 458A and 458B, pivot bolts 457A and 457B, retaining strap 456A. As with FIG. 4A and FIG. 4B illustrates geared levers 454A, 454B, 455A and 455B with handles 451 and 460 in the down and locked position. Additionally, operator side flanges 433A and 433D as well as production side flange 431A are visible.

Figure 4C:
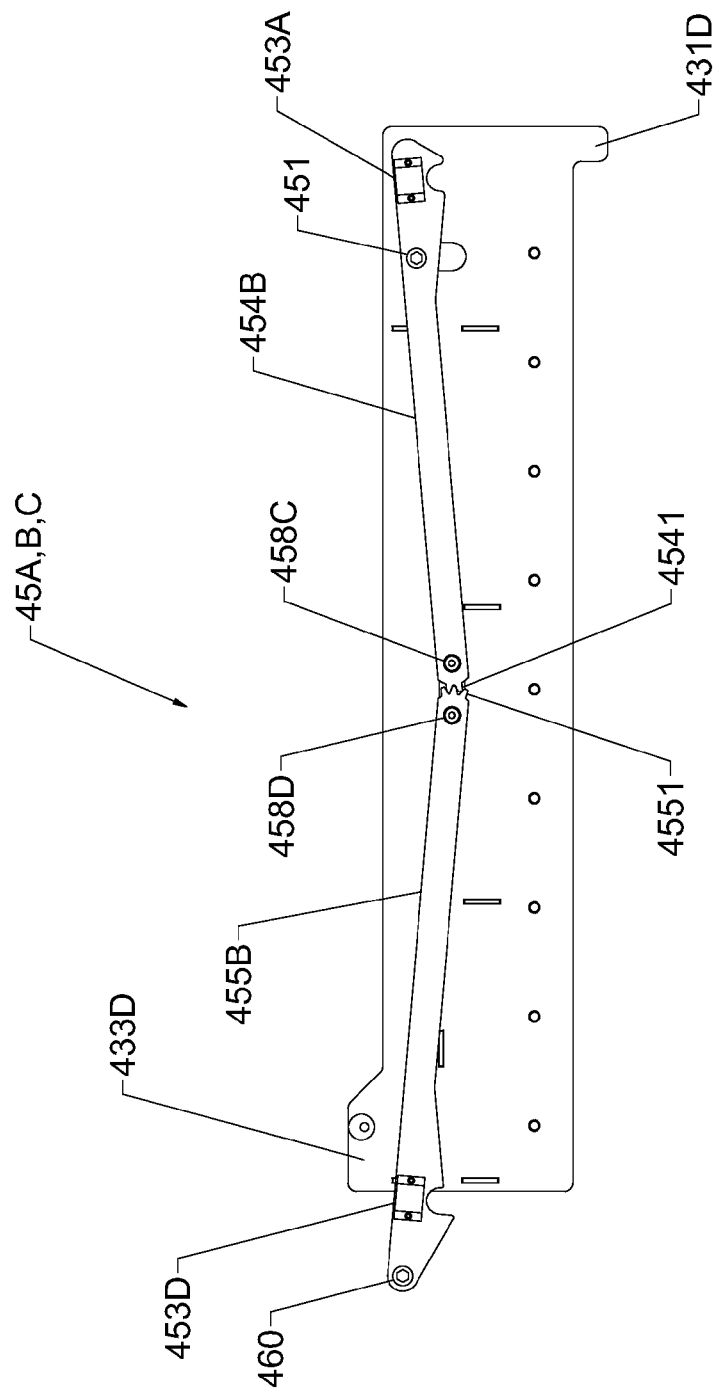
FIG. 4C is a side view of the position sensing end of a single drawer assembly illustrating the drawer geared levers, lever pivots and lifting handles for the single drawer assembly.

FIG. 4C is a view of the sensor end 74 of drawer assembly 45 with retaining strap 456B removed to show gear levers 454B and 455B with handles 451 and 460 in the up and unlocked position. Given the gearing system of this embodiment, raising either operator side handle 460 or production side handle 451 causes both levers 455B and 454B to rise together to the unlocked position. FIG. 4C illustrates the method and apparatus for congruently unlocking the part supply drawer from either side of the enclosure. Geared levers 454B and 455B each have a unique geared tooth profile 4541 and 4551 located at the extremities opposing handles 451 and 460. When operator side handle 460 is raised, the attached geared lever 455B pivots about bushing 458D, creating a clockwise rotational translation of gear teeth 4551, thus inducing a counter-clockwise rotational translation of gear teeth 4541 on geared lever 454B, which in turn pivots about bushing 458C thus congruently raising production side handle 451. As noted the inverse movement of both levers together also happens when raising production side handle 451 is raised from the locked to unlocked position. Operator side-locking notch 415 and production side-locking notch 416 which engage the locking pins 409A and 410A to lock the drawer in place at the three positions can be seen in FIG. 3B. All of the levers on each of the drawer assemblies are configured and function in the same fashion as described herein.

Figure 4D:
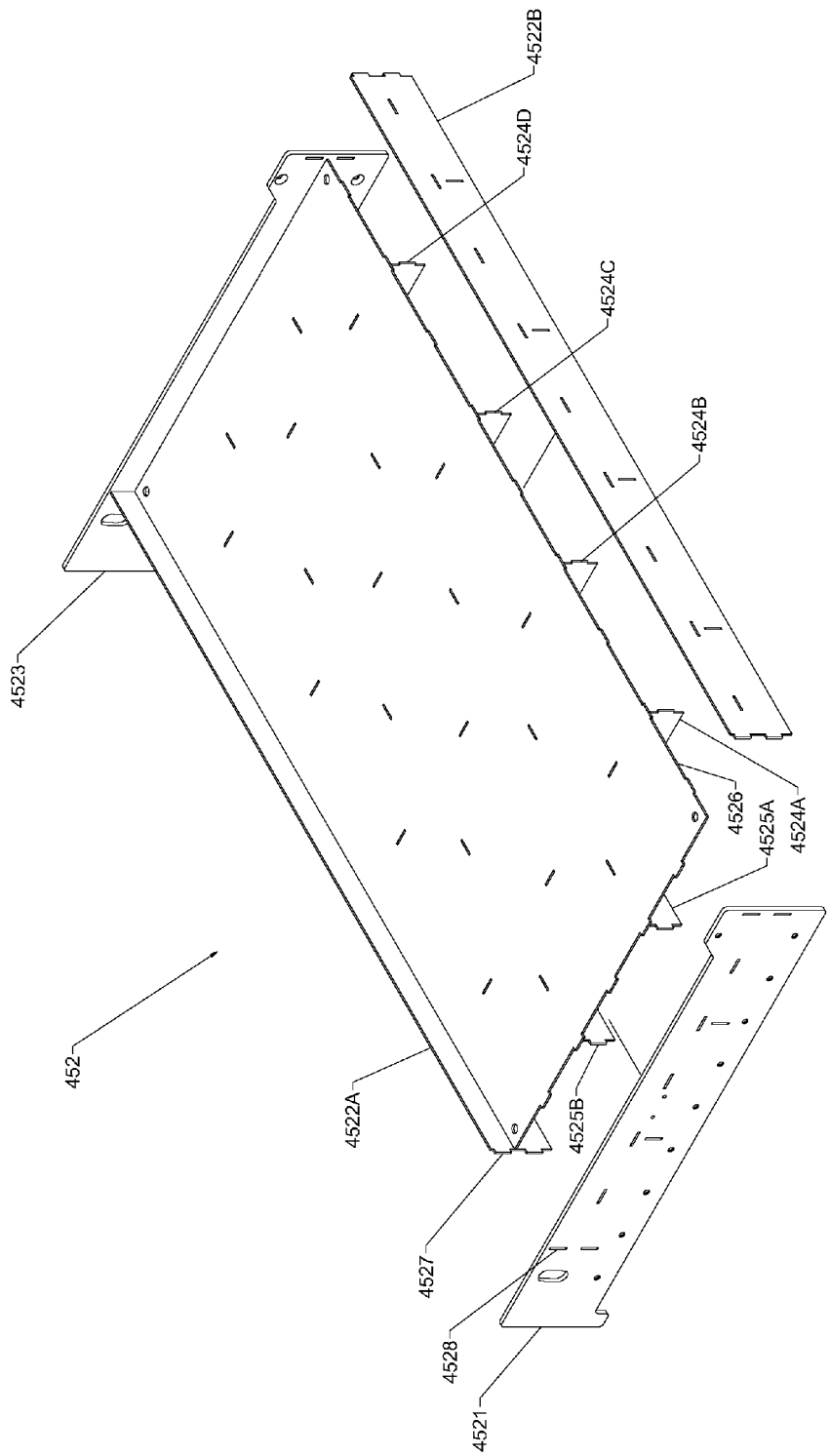
FIG. 4D is a perspective exploded view of a single drawer weldment illustrating tab and slot drawer construction for a single drawer assembly.

FIG. 4D is a top partially exploded view of a preferred embodiment of the drawer structure which shows how in the depicted embodiment non-sensor end drawer plate 4521, sensor end drawer panel 4523, production side panel 4522A, and operator side panel 4522B are interconnected and supported by longitudinal ribs 4525A and 4525B, latitudinal ribs 4524A, 4524B, 4524C and 4524D, as well as drawer bottom 4526. As can be seen in the embodiment depicted a tab and slot construction is used throughout as illustrated by tab 4527 fitting into slot 4528. In the preferred embodiment the connected tabs and slots are welded.

Figure 4E:
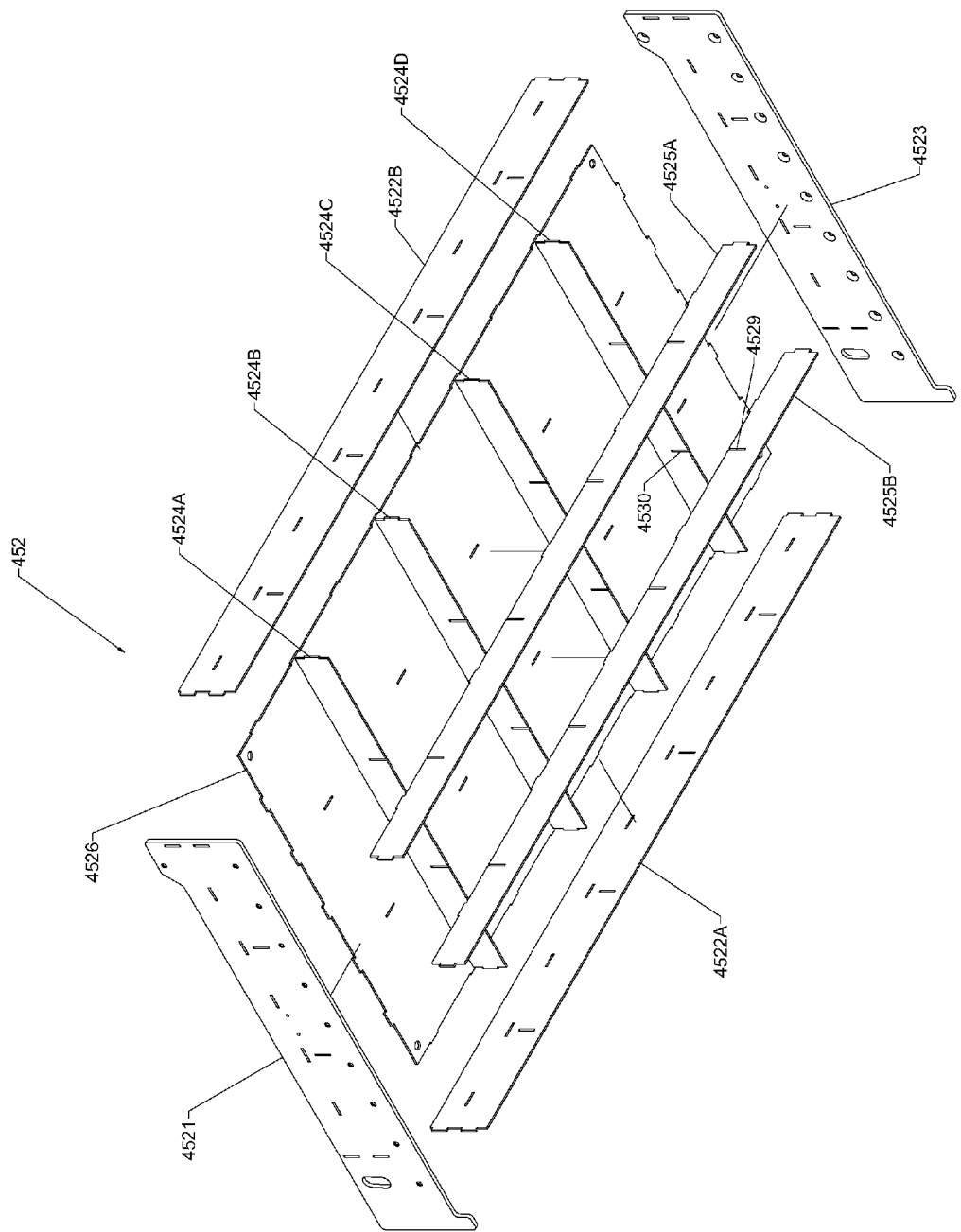
FIG. 4E is a perspective exploded view of a single drawer weldment illustrating the drawer underside reinforcing construction for a single drawer assembly.

FIG. 4E, an exploded bottom view of the drawer structure 452, reveals drawer bottom 4526, longitudinal ribs 4525A and 4525B that are cross-linked with latitudinal ribs 4524A, 4524B, 4524C and 4524D through use of slot 4529 and slot 4530 where the slots fit into each other to form a rigid under structure. Drawer structure 452 becomes a unitized rigid structure during welding process whereby all tab and slot interface points are permanently secured in place by welds.

The latitudinal and longitudinal ribbing structure of drawers 45A, B and C as depicted in FIGS. 4D and 4E provide a strong light weight precision unitized structure for placement of parts fixing apparatus 102 as depicted in FIG. 2.

Enclosure Structure

Figure 5A:
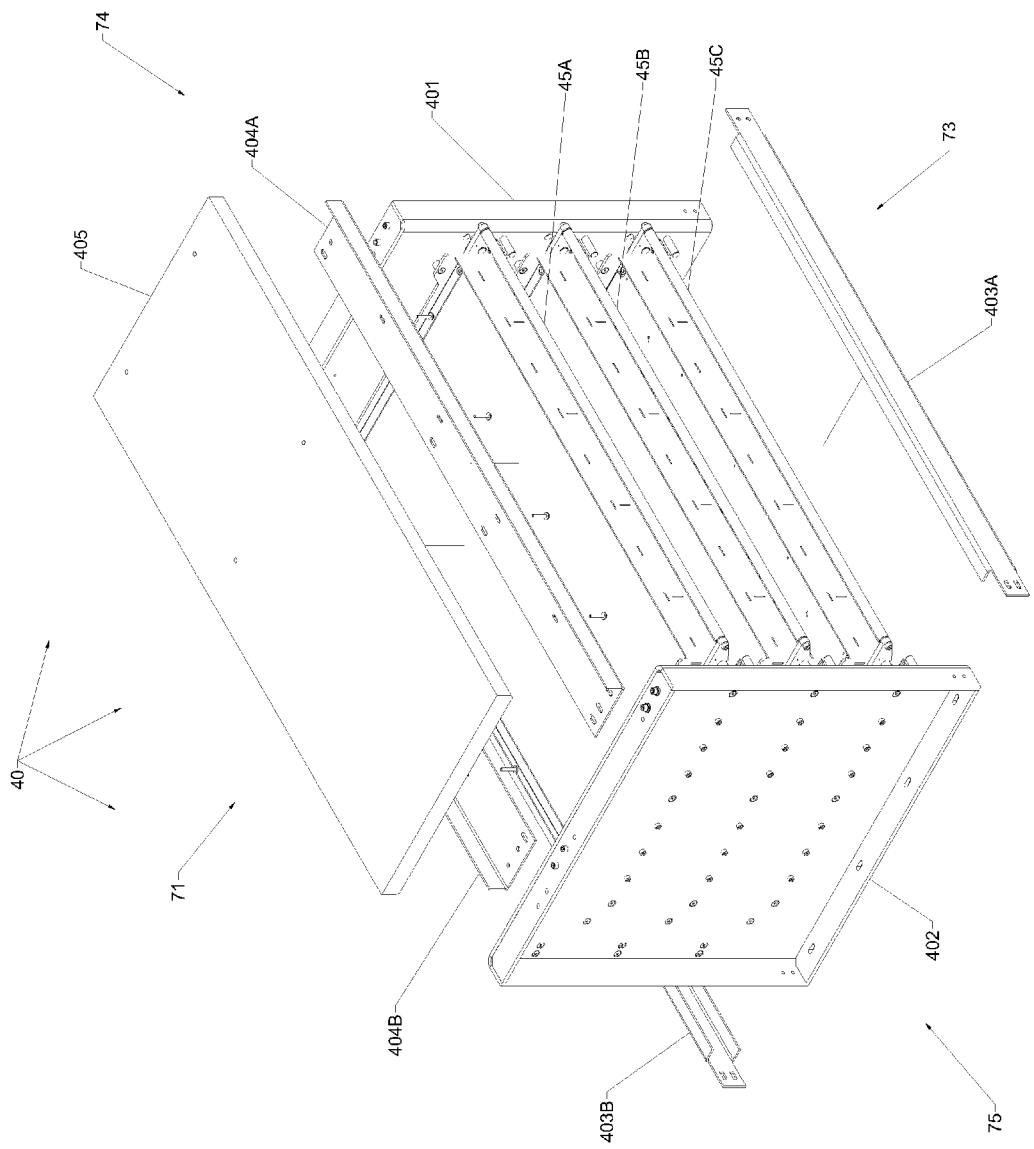
FIG. 5A is a perspective exploded view of the part supply drawer enclosure of the part supply drawer system.

FIG. 5A is an exploded perspective view of part supply drawer enclosure 40 from operator side 73 non-sensor end 75 that includes: end frame panels 401 and 402, lower channel brace 403A and 403B, top angle brace 404A and 404B, work surface 405 and drawer assemblies 45A, 45B and 45C.

Figure 5B:
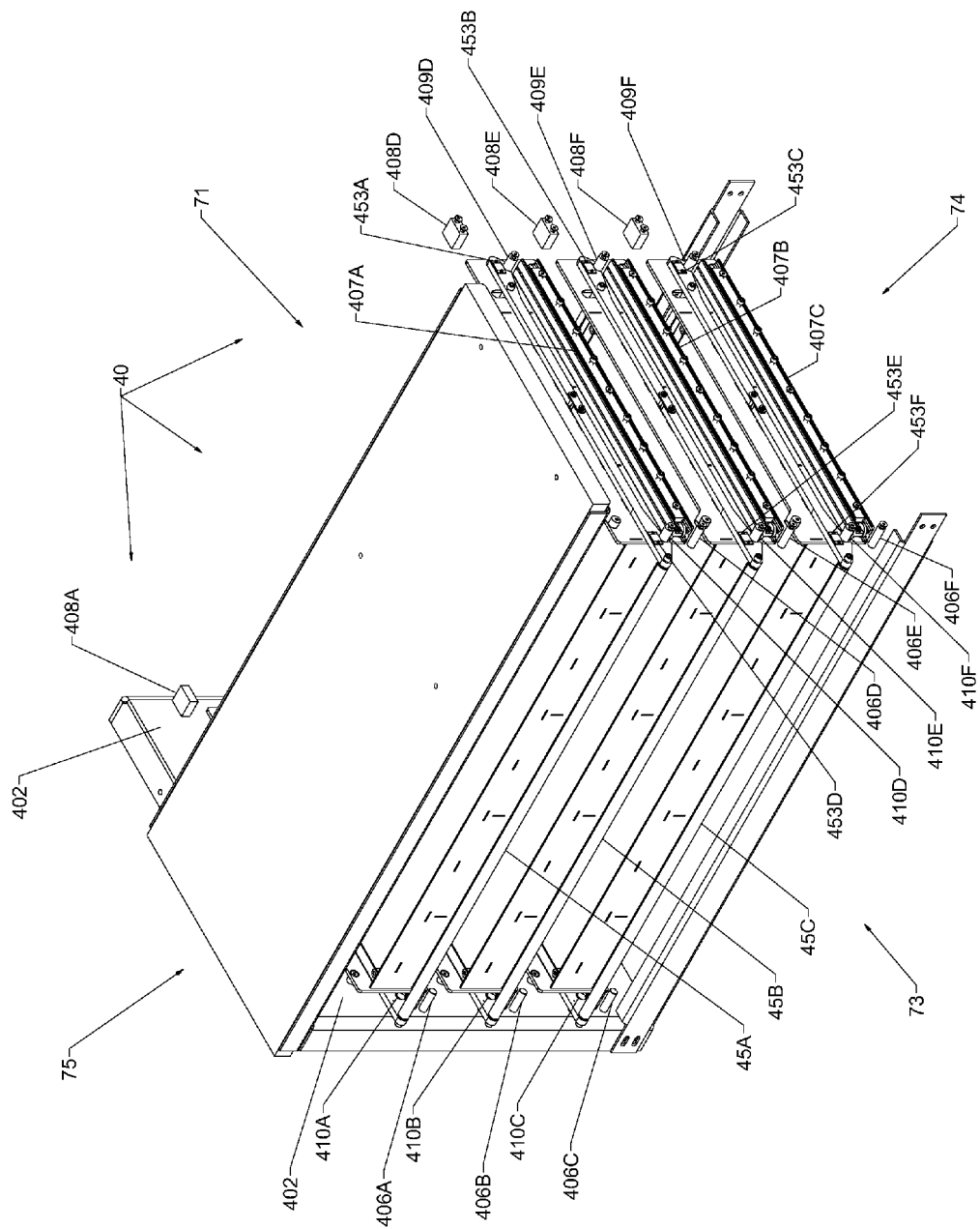
FIG. 5B is a perspective view of the part supply drawer enclosure from the operator side-sensor end with sensor end panel removed to illustrate the drawer slides, various stop and locking pins for the part supply drawer enclosure.

FIG. 5B is a perspective view of part supply drawer enclosure 40 from operator side 73 sensor end 74 with panel 401 removed for illustrative purposes. Panel 402 is on the opposite end. As can be seen in FIG. 5B drawer enclosure 40 includes operator side drawer locking pins 410A, 410B, 410C, 410D, 410E and 410F, production side drawer locking pins 409D, 409E, and 409F operator side drawer full extension stop pins 406A, 406B, 406C, 406D, 406E and 406F, production side drawer full extension stop blocks 408A, 408D, 408E and 408F.

Figure 5C:
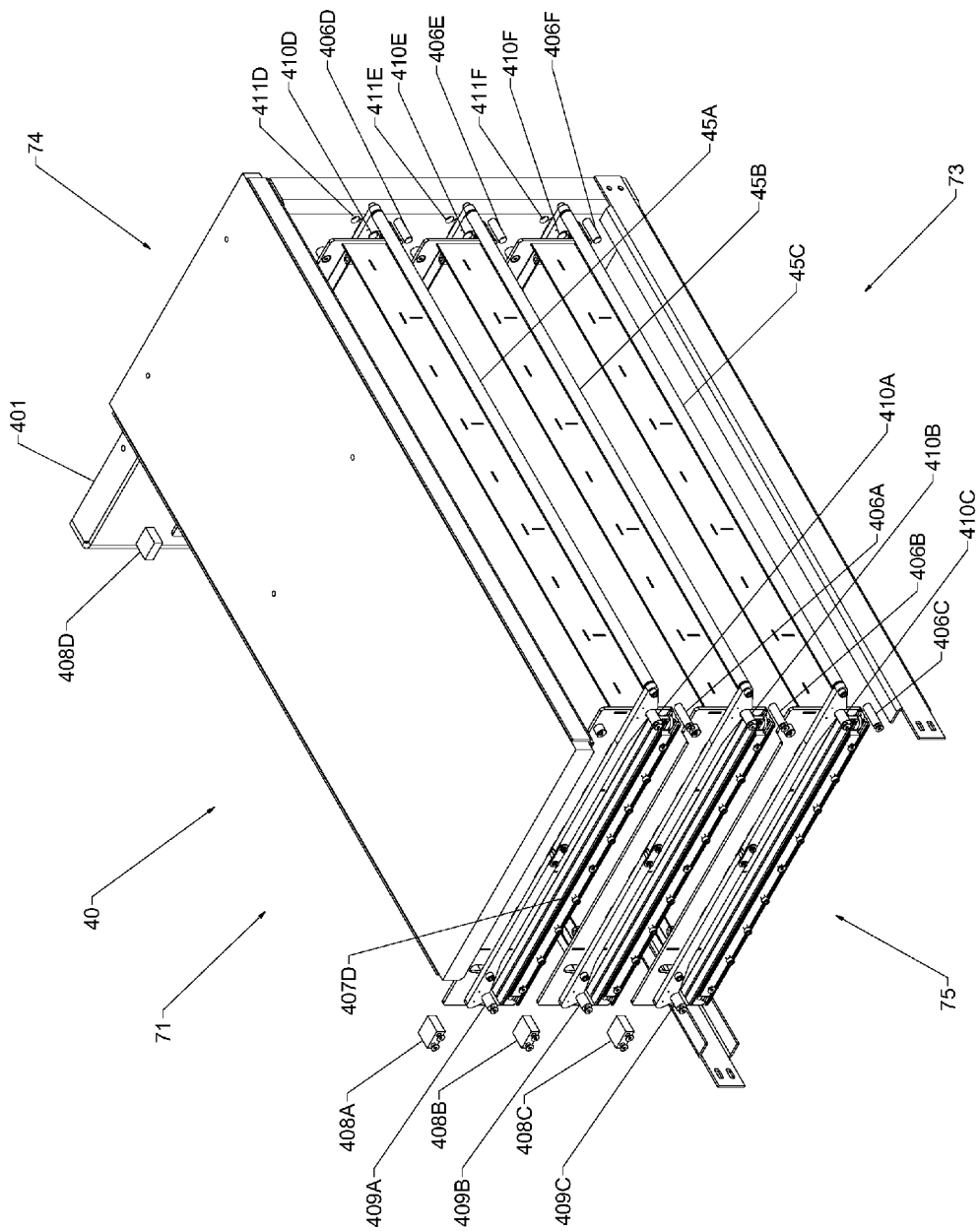
FIG. 5C is a perspective view of the part supply drawer enclosure from the operator side-non-sensor end a perspective with the opposite non-sensor panel removed to illustrate aspects of the part supply drawer enclosure.

5C is a perspective view of part supply drawer enclosure 40 from operator side 73 and non-sensor end 75 with panel 402 removed for illustrative purposes. Panel 401 is on the opposite end. As can be seen in FIG. 5C drawer enclosure 40 depicted are operator side drawer locking pins 410A, 410B, 410C, 410D, 410E and 410F, production side drawer locking pins 409A, 409B and 409C, operator side drawer full extension stop pins 406A, 406B, 406C, 406D, 406E and 406F, production side drawer full extension stop blocks 408A, 408B, 408C and 408D.

As noted above drawer assemblies 45A, 45B and 45C interact with both stop and locking pins to provide accurate drawer positioning in the embodiment of the invention depicted. As depicted in FIG. 3C when drawer 45A is opened on the production side 71 to the full open position production side stop flange 431A engages production side full extension stop pin 408A at which point locking notch 415 engages production side locking pin 409A when lever 454A is lowered from the unlocked to locked position. Likewise as depicted in FIG. 3D when drawer 45A is opened on the operator side 73 to the full open position operator side stop flange 433A engages operator side full extension stop pin 406A at which locking notch 416 engages locking pin 410A when lever 455A is lowered from the unlocked position to the locked position.

Drawer Position Determination Apparatus

Figure 5D:
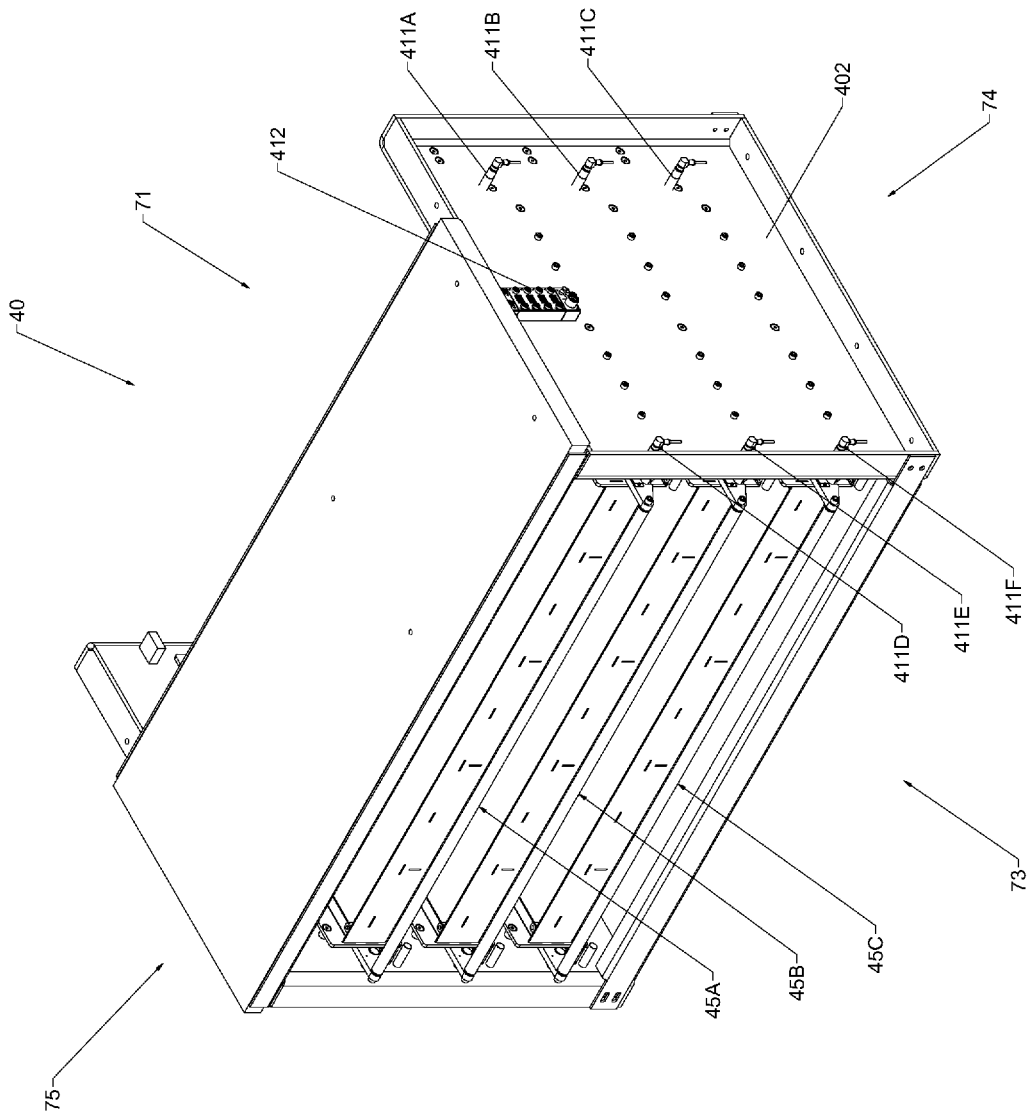
FIG. 5D is a perspective view of the parts supply drawer enclosure from the operator side sensor end with both side panels attached to illustrate drawer position sensors in the parts supply drawer enclosure.

The embodiment of the invention depicted has an apparatus that informs controller 35 FIGS. 1 & 2 as to the exact position of each drawer. Referring to FIG. 5D supply drawer enclosure 40 includes in panel 401 drawer position sensors 411A, 411B, 411C, 411D, 411E and 411F that are operatively connected by appropriate wring, not shown to sensor input collector 412, which collates drawer position sensor data and sends it to the robot for program interaction either by a direct electronic connection or through controller 35 that in turn sends the information on position of each of the drawers to the robot. Position sensors 411A, B, C, D, E and F are positioned in side panel 401 and pass through side panel 401 so that when the drawers are in the close and locked position they are opposite a corresponding position reflectors depicted in FIG. 5B 453A, B, C, D, E, and F. Thus, when panel 401 is attached to the side of drawer enclosure 40 and drawers 45A, 45B and 45C are in the closed locked position sensors and reflectors of each drawer correspond as follows: 411A-453A, 411B-453B, 411C-453C, 411D-453D, 411E-453E and 411F-453F.

Thus the position of the individual drawers 45A, 45B and 45C and whether or not they are in a locked position may be determined with great certainty based upon the status of these sensors. As noted above complementary to these sensors 411A and 411D are reflectors 453A and 453D that as noted are secured to geared lever arms 454B and 455B as illustrated in FIG. 4A. For example in determining the actual position of drawer 45A, drawer position sensors 411A and 411D will both be activated when the drawer is in the middle of the part supply enclosure 40 and handles 451 and 460 are in the down and locked position as illustrated in FIG. 3A (with panel 401 attached). When the drawer has been fully opened and locked at the production side only as depicted in FIG. 3C sensor 411A will be activated since it will now be opposite sensor reflector 453D. Also, when the drawer has been fully opened and locked at the operator side as depicted in FIG. 3D, only sensor 411D will be activated as it will opposite sensor reflector 453A. Here again the drawer must be in full open position and geared lever 455B in the down and locked position before sensor 411D will be active. Drawer position sensor operation for drawers 45B and 45C function in the same manner as that described for drawer 45A.

Parts Fixing Apparatus

Figure 6:
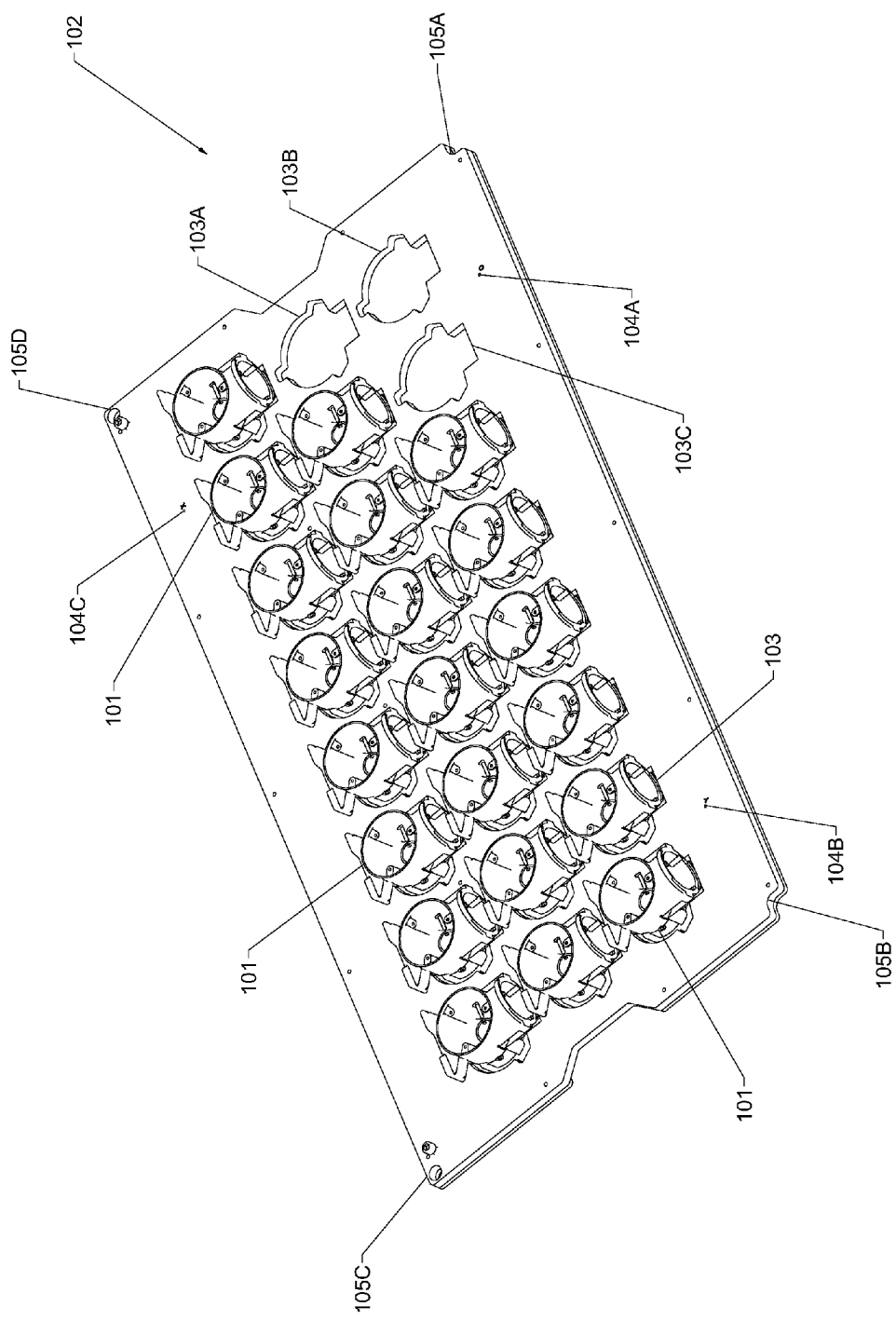
FIG. 6 is a perspective view of the parts fixing apparatus partially filled with parts.

FIG. 6 is a perspective view of the parts fixing apparatus 102 with parts 101 positioned in all of the position slots 103 of the matrix like sheet except for three in the corner of the parts fixing apparatus namely slots 103A, 103B and 103C. In each corner of parts fixing apparatus are notches 105A, 105B, 105C and 105D which notches are designed to fit against part fixing locators 462A, 462B, 462C, and 462D which can be seen in FIGS. 1, 4A and 4B. Parts fixing apparatus 102 is configured such that when placed in one of the drawers 45A, 45B or 45C parts located in it are positioned in a predefined position in space so robot 15 can be programmed to pick up each of the parts held by parts fixing apparatus 102. This is achieved by a combination of locking the drawers in a predetermined position in space as described above and the precise positioning of the parts within the drawer with part fixing apparatus 102.

Thus, as can be discerned from the above detailed description parts supply manufacturing assembly 10 as depicted in FIGS. 1 and 2 and the rest of the drawings, whether it has an integrated frame 20 or is a stand-alone assembly can be easily integrated into a wide variety of manufacturing processes and assist in the control and movement of a large number of parts required for that process. The combination of the drawer position determining apparatus as described in the preceding paragraphs and together with the ability to precisely position parts in a drawer described in a preferred embodiment in the preceding paragraph gives the parts supply drawer manufacturing assembly the unique flexibility to be integrated into a wide variety of computer controlled systems, whether that computer resides in the manufacturing robot, is a laptop of a technician operating the system, or some other type of a computer system which is in operative control of the manufacturing process.

Robot Tool

Figure 7:
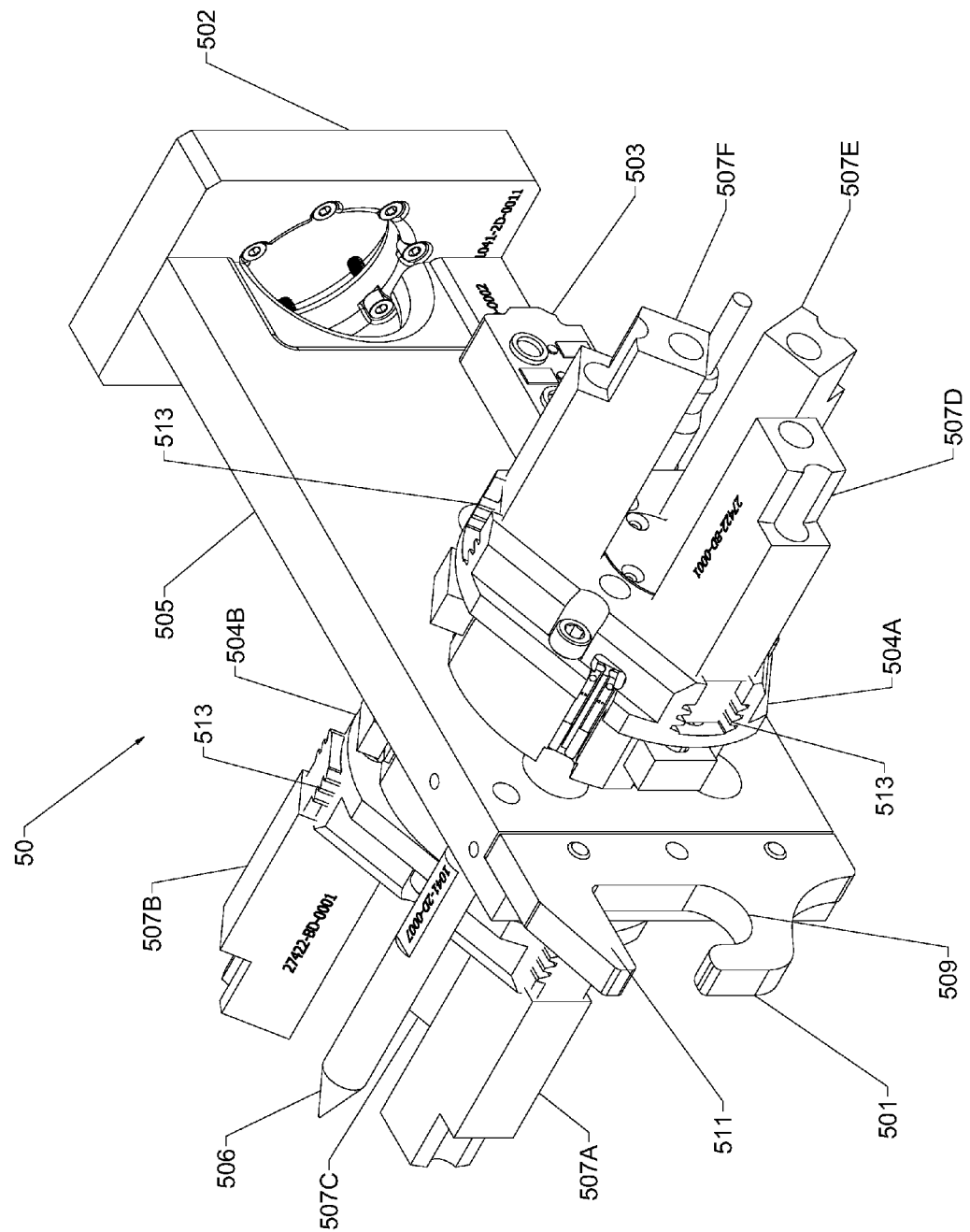
FIG. 7 is a perspective view of a robot tool illustrating robot attachment point, framework, gripping modules, gripping fingers, tool frame pointer and drawer hook apparatus for the part supply drawer system.
Figure 8A:
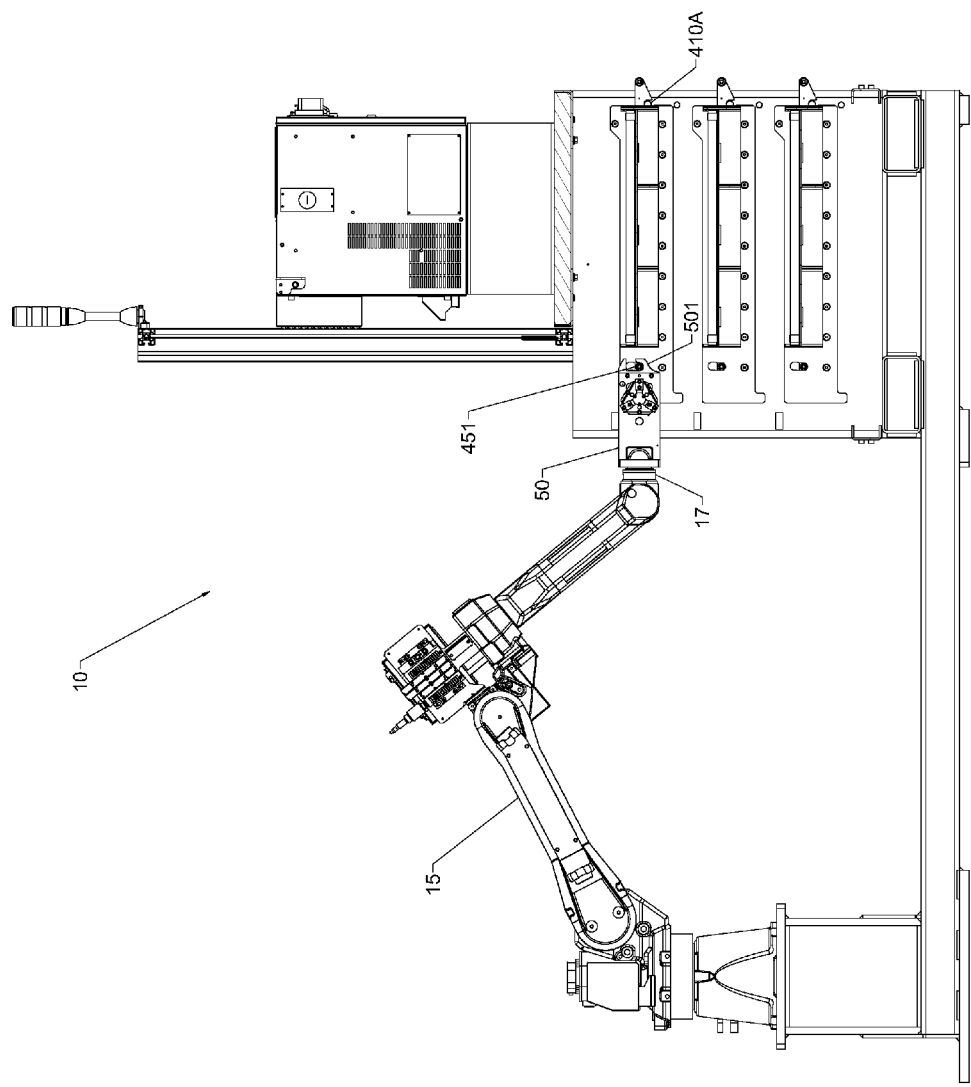
FIG. 8A is a side view of the part supply drawer system (along plane I-I of FIG. 1 with drawer enclosure side panel, drawer levers and drawer end panels removed for description purposes) illustrating the robot tool hook grasping the handle of a drawer while the drawer is in fully locked position prior to unlocking and opening a drawer to begin the production process.

Referring to FIG. 7, robot tool 50 includes the following components: robot adaptor plate 502, tool frame 505, drawer hook apparatus 501, grippers 504A and 504B, part gripping fingers 507A, 507B, 507C, 507D, 507E and 507F, tool frame pointer 506, and sensor collator 503. Robot tool 50 is operatively connected to robot arm 17 as depicted in FIGS. 1 and 2 and is used by the robot 15 for part gripping and manipulation as well as drawer opening and closing on the production side of the invention. As depicted in FIGS. 3A and 8A hook apparatus 501 enables engagement of the production side drawer handle 451A with the robot arm 17. Referring back to FIG. 7 hook apparatus 501 on robot tool 50 includes a bottom "U-shaped" area 509 for engaging the production side handle, but also incorporates a top overhung feature 511 used to ensure that the handle has been pushed down for proper engagement and drawer locking mechanism.

Robot 15 then will pick up each part 101 as depicted in FIG. 2 and use the part in a manufacturing process. As can be seen in FIG. 7 the first gripper 504A has three movable fingers 507D, 507E and 507F which slide in and out on groves 513. Likewise gripper fingers 507A, 507B and 507C would be moved in the same fashion with along groves 513 on gripper 504A. Additionally, gripper 504A includes a tool frame pointer 506 which enables the setup of user frames for each drawer. A user frame establishes the X, Y and Z planes for each drawer promoting the accurate and repeatable movement of robot 15 when picking and placing part 101 into and out of the part fixing apparatus 102. In the preferred embodiment a pneumatic system would be used to move the moving parts of root tool 50. Additionally, robot 15 would move robot arm 17 in the standard fashion. Robot tool 50 operatively connects in a standard fashion to robot arm 17 so robot 15 can control function of robot tool 50.

As can be seen in FIG. 7 robot tool 50 has two different gripping subassemblies 504A and 504B. As will be appreciated by those skilled in the art based on the above description use of parts fixing apparatus 102 in conjunction of the overall system described allows for incorporation of a wide variety and size of parts in the manufacturing process with only the change of the parts fixing apparatus 102 and gripper fingers 507A, B, C, D, E, and F to accommodate the parts of various configurations.

Figure 8B:
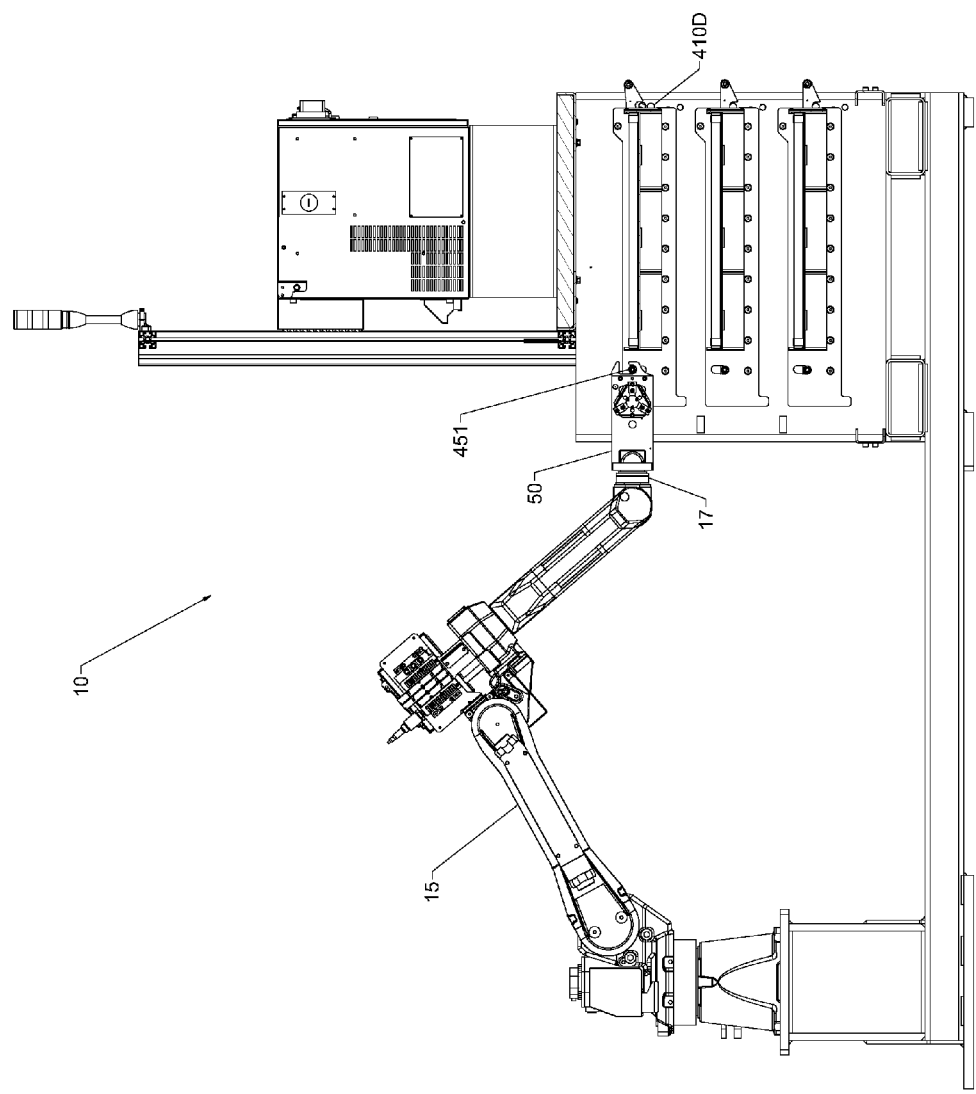
FIG. 8B is a side view of the part supply drawer system (along plane I-I of FIG. 1 with drawer enclosure side panel, drawer levers and drawer end panels removed for description purposes) illustrating the robot tool hook grasping the handle after it has moved the handle of the drawer to the unlocked position on the production side prior to pulling out the drawer to its full open position.
Figure 8C:
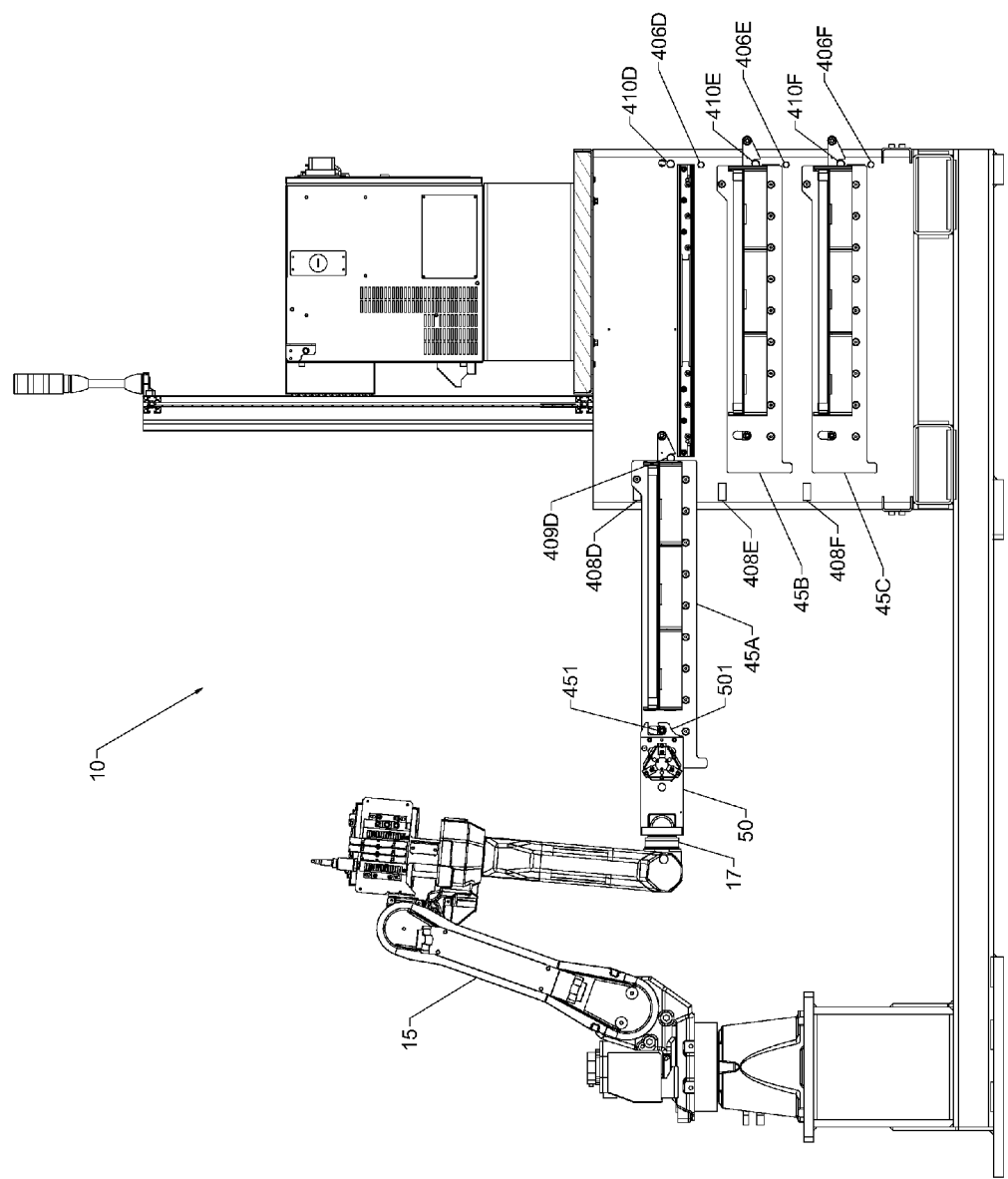
FIG. 8C is a side view of the part supply drawer system (along plane I-I of FIG. 1 with drawer enclosure side panel, drawer levers and drawer end panels removed for description purposes) illustrating a drawer after it has been pulled to the full open and locked position on the production side of the part supply drawer enclosure.

FIGS. 8A, 8B and 8C are a cross-sectional side view of parts supply drawer enclosure 40 along plane I-I of FIG. 1 with non-sensor end frame panel 402 removed as well as the levers and drawer end panels removed to illustrate how robot 15 with robot tool 50 attached to robot arm 17 opens the drawer. In FIG. 8A robot 15 with robot tool 50 has engaged handle 451 with hook 501. In FIG. 8B robot 15 has started to lift handle 451 which simultaneously causes handle 460 to also rise and as depicted disengage operator side notch 415 on lever 455D from operator side locking pin 410D. In FIG. 8C robot 15 has pulled drawer 45A out to the point where production side stop flange 431D engages production side drawer full extension stop pin 408D and has lowered handle 451 so that notch 415 on lever 455D engaged production side locking pin 409D.

Frame Work Assembly

Figure 9:
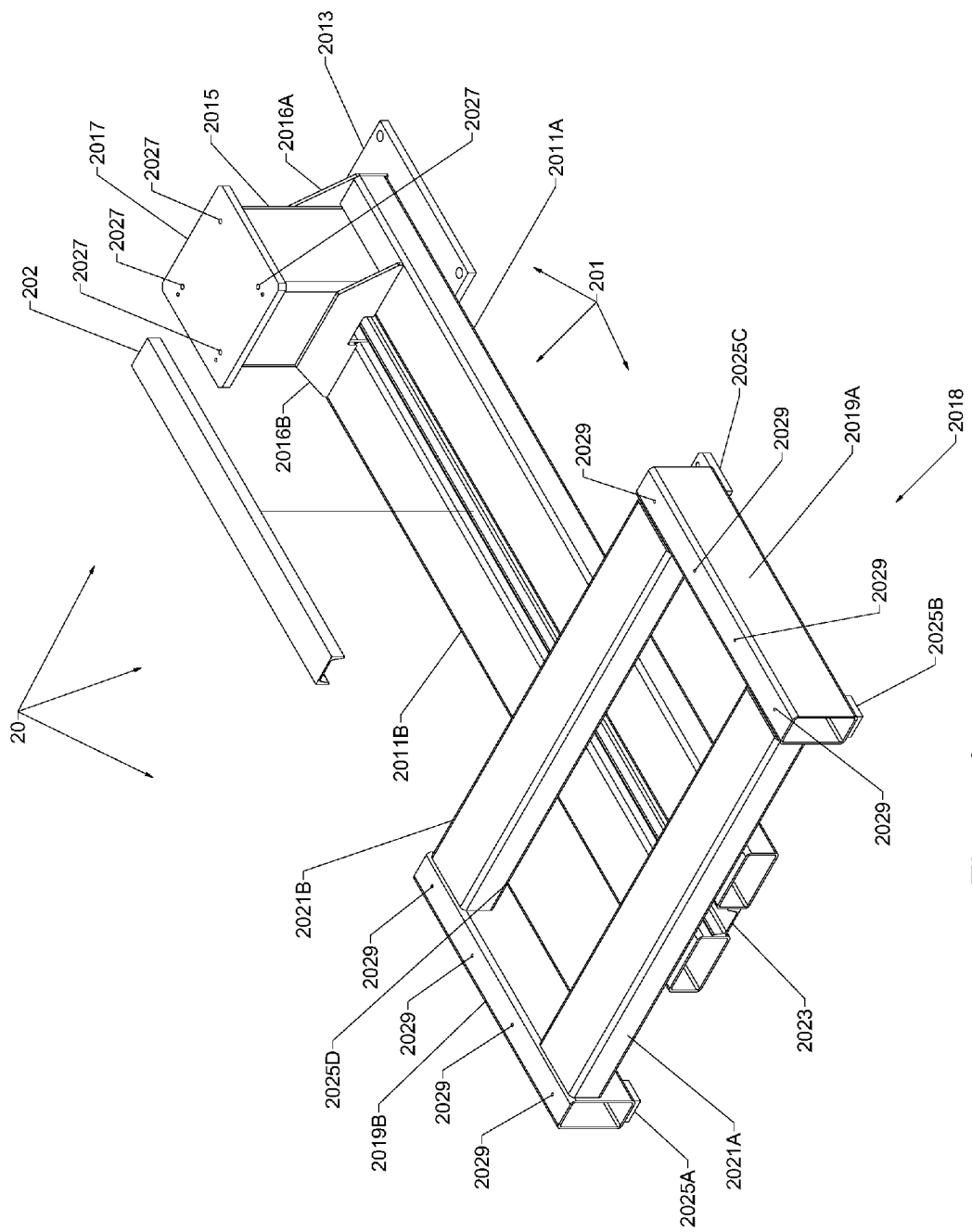
FIG. 9 is a perspective view of the framework for mounting the parts supply drawer enclosure and the manufacturing robot of the parts supply manufacturing system.

Referring to FIG. 1 a framework assembly 20 is provided to support the part supply drawer enclosure 40 and robot 15. Referring to FIG. 9 framework assembly 20 in a preferred embodiment is made up of metal pieces of appropriate geometric shapes welded together to create a weldment 201. Weldmont 201 includes longitudinal runners 2011A and 2011B which as depicted are hollow rectangular tubes that rest at a first end on and are attached fixedly to base plate 2013. The longitudinal runner's project from the base plate parallel to each other being separated and connected at their base by cable channel 2023 along their entire bottom in side length. A pedestal 2015 is connected to the tops of longitudinal runners 2011A and 20011B and further supported and positioned by pedestal support brackets 2016A and 2016B. Pedestal 2015 is capped off by top plate 2017. In the preferred embodiment depicted all of the pieces are welded together to form part of the weldment 201.

At the opposite end of longitudinal runners 2011A and 2011B is drawer enclosure support structure 2018 consisting of enclosure runners 2019A and 2019B, which as depicted in FIG. 8 are hollow rectangular tubes. Enclosure runners 2019A and 2019B connect by enclosure cross supports 2021A and 2021B which in the preferred embodiment are welded to enclosure runners 2019 A and 2019B. Also, as depicted in the preferred embodiment in FIG. 9 enclosure runners and cross supports are sized and configured such that cross pieces 2021A and 2021B rest on top of the ends of longitudinal channels 2011A and 2011B as depicted in FIG. 9. The preferred embodiment of enclosure support structure 2018 depicted includes support pads 2025A, 2025B, 2025C and 2025D. Additionally, enclosure support structure 2018 can either be permanently attached to the end of longitudinal runners 2011A and 2011B by welds or alternatively be detachably connected by screws or nuts and bolts or some other detachable connecting mechanism.

Pedestal top plate 2017 has appropriate apertures 2027 for detachably connecting a manufacturing robot. Enclosure support structure 2018 includes appropriate apertures 2029 on enclosure runners 2019A and 2019B to detachably connect drawer enclosure 40 with nuts and bolts or other appropriate detachable connecting mechanism. In a preferred embodiment wiring for control and sensing would run between the drawer enclosure positioned on enclosure support structure 2018 and a robot positioned on pedestal top plate 2017 along cable channel 2023 that runs between longitudinal runners 2011A and 2011B. In a preferred embodiment a detachable cable channel cover 202 fits over cable channel 2023 to provide a protective cover for wires running in the channel.

Framework assembly 20 as described in FIG. 9 and shown in operation in various other figures including FIGS. 1 and 2 has a number of advantages with respect to setup and moving and operating the system. Referring to FIG. 1 movement of just the framework assembly 20 or the entire parts supply manufacturing assembly 10 can be accomplished with a fork truck of adequate capacity since longitudinal runners 2011A and 2011B are sized and positioned to receive the forks of a fork lift truck. Additionally, the "T" shaped aspect of this framework assembly 20 which can be seen in FIG. 2 facilities operator access in and around parts supply manufacturing assembly 10. An abundance of choices are available for analogous configurations of the framework which attach to part supply drawer enclosure 40. This modularity and interchangeability provides the impetus and method for employing various sized robots as well as enabling a stand-alone part supply drawer enclosure without the robot component.

Referring to FIGS. 1 and 2 parts supply drawer enclosure 40 can also function as a standalone structure that can function with a floor mounted or separately mounted robot, not shown. In such a configuration enclosure 40 would not have longitudinal runners 2011A and 2011B attached to it, but would sit directly on the floor. This standalone configuration would allow the parts supply drawer enclosure 40 to function with larger and smaller robots.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A parts supply drawer apparatus for a robot assisted manufacturing system comprising:
   a. a drawer enclosure;
   b. at least one drawer in said drawer enclosure, said at least one drawer movable from an open production position to a closed position to an open operation position, whereby access to said drawer is available at said production position and said operation position;
   c. locking mechanisms for detachably locking said at least one drawer in said closed position, said production position and said operation position:
      i. where said locking mechanism comprises a production lever and an operation lever, wherein said production lever and said operation lever each have first ends that are geared together and pivotally mounted at their first ends at the center of a first end of said at least one drawer and wherein said production lever projects to a production side of said at least one drawer and terminates in a second end and the said operation lever projects to an operation side of said at least one drawer and terminates in a second end and when either said second end of said production lever or said second end of said operation lever are moved both levers move in unison to unlock said at least one drawer for movement among said open production position, said closed position and said operation position; and
      ii. wherein said first ends of said production lever and said operation lever are geared together by interleaved toothed gears to allow for both levers move up and down together in unison, whereby when one of said levers moves in a clockwise direction said other lever moves in a counterclockwise direction;
   d. said at least one drawer has a positioning apparatus to precisely place said at least one drawer at said production position in a repeatable precise and predetermined position; and
   e. a removable positioning matrix in said at least one drawer to thereby precisely position within said at least one drawer a plurality of work pieces placed in said matrix for extraction from said at least one drawer by a robot during a manufacturing process.

2. The parts supply drawer apparatus of claim 1 wherein a sensor system placed in said drawer enclosure and on said at least one drawer allow a computer aided production system to determine the position of said at least one drawer at said production position, said closed position and said operation position.

3. The parts supply drawer apparatus of claim 1 wherein said production lever and said operation lever each have a notch adjacent to said second end of each lever wherein when said drawer is in said locked closed position said notch of said production lever is positioned on a locking knob attached to said drawer enclosure on said production side and said notch of said operation lever is positioned on a locking knob attached to said drawer enclosure on said operation side and movement of either said second end of said production lever or said second end of said operation side lever lifts both levers off of said locking knobs to unlock said at least one drawer for movement.

4. The parts supply drawer apparatus of claim 3 wherein when said at least one drawer is locked at said production position said notch of said operation lever rests on said locking knob on said production side of said drawer enclosure and when said at least one drawer is locked at said operation position said notch of said production lever rests on said locking knob on said operation side of said drawer enclosure.

5. The parts supply drawer apparatus of claim 1 further comprising a mirror image production lever and a mirror image operation lever on an a second end opposite said first end of said at least one drawer that function in the same fashion as said production lever and said operation lever and wherein a production handle connects said second end of said production lever to a second end of said mirror image production lever and an operation handle that connects said second end of said operation lever to a second end of said mirror image operation lever, and wherein when either said production handle or said operation handle are moved said levers move in unison to unlock or lock said drawer.

6. The parts supply drawer apparatus of claim 5 wherein when said levers are down they are in the locked position and when they are up they are in the unlocked position.

7. The parts supply drawer apparatus of claim 1 wherein said at least one drawer is a plurality of drawers.

8. The parts supply drawer apparatus of claim 1 wherein said positioning apparatus at of said least one drawer comprises a first flange adjacent said production side of said drawer so that when said drawer is moved to said operation position said first flange engages a first stop on said drawer enclosure adjacent said operation side to thereby stop and position said at least one drawer in a predetermined position at said operation position and a second flange adjacent said operation side of said at least one drawer so that when said drawer is moved to said production position said second flange engages a second stop on said drawer enclosure adjacent said production side of said drawer enclosure to thereby stop and position said at least one drawer in a predetermined position at said production position.

9. The parts supply drawer apparatus of claim 6 wherein movement of said levers in an upward direction is stopped by a drawer handle engaging a mechanical stopping mechanism selected from the group of a stopping knob or an upper portion of a slot through which said handle projects.

10. The parts supply drawer apparatus of claim 2 wherein said sensor system consist of transceivers positioned on an inside of said parts supply drawer apparatus in a predetermined location to thereby interact with reflectors positioned on said at least one drawer and determine the position of said at least one drawer at said production position, said closed position or said operation position.

11. The parts supply drawer apparatus of claim 10 including a computer controller for monitoring a position of said at least one drawer with said sensors to thereby control operation of a manufacturing robot accessing said drawer during a manufacturing process.

12. The parts supply drawer apparatus of claim 1 including a structure for supporting and positioning said drawer enclosure for use in a manufacturing operation said frame having a base configured to receive forks of forklift truck to engage structure for supporting and positioning said drawer enclosure to thereby facilitate movement of sand parts supply drawer apparatus by a forklift.

13. The parts supply drawer apparatus of claim 12 wherein said structure for supporting and positioning said drawer enclosure includes a base on which to position a robot to access said drawer enclosure during a manufacturing process and said support structure is has a T shape to minimize use of floor space and allow for operator access during a manufacturing process.

14. The parts supply drawer apparatus of claim 1 further comprising a robotic arm with a robot tool to engage a handle on said production end of said at least one drawer.

15. The parts supply drawer apparatus of claim 14 wherein said robot tool has a hook to engage said handle on said at least one drawer to unlock it and move it between said closed position and said production position and at least one grasping mechanism to grasp and pick up parts positioned in said at least one drawer.

16. The parts supply drawer apparatus of claim 1 wherein said at least one drawer is fabricated by a tab and slot construction with a longitudinal and latitudinal ribbing construction.

* * * * *